United States Patent
Scalchi et al.

(10) Patent No.: US 11,400,618 B2
(45) Date of Patent: Aug. 2, 2022

(54) METHOD FOR MAKING A COMPOSITE PANEL, PREFERABLY CEMENTITIOUS MORTAR BASED, WITH LIGHT TRANSLUCENCY PROPERTIES

(71) Applicants: Italcementi S.P.A., Bergamo (IT); Gesteco S.P.A., Povoletto (IT)

(72) Inventors: Enrico Scalchi, Milan (IT); Andrea Munini, Attimis (IT); Alexandra Luci, Moimacco (IT)

(73) Assignee: Gesteco S.p.A., Povoletto (IT)

( * ) Notice: Subject to any disclaimer, the term of this patent is extended or adjusted under 35 U.S.C. 154(b) by 119 days.

(21) Appl. No.: 16/614,629

(22) PCT Filed: May 18, 2018

(86) PCT No.: PCT/IB2018/053522
§ 371 (c)(1),
(2) Date: Nov. 18, 2019

(87) PCT Pub. No.: WO2018/211471
PCT Pub. Date: Nov. 22, 2018

(65) Prior Publication Data
US 2020/0199873 A1    Jun. 25, 2020

(30) Foreign Application Priority Data
May 19, 2017    (IT) .................... 102017000054669

(51) Int. Cl.
*B28B 23/00*       (2006.01)
*E04C 2/54*        (2006.01)
(Continued)

(52) U.S. Cl.
CPC .......... *B28B 23/0037* (2013.01); *E04C 2/543* (2013.01); *B28B 23/0056* (2013.01);
(Continued)

(58) Field of Classification Search
CPC ... E04C 1/42; E04C 2/54; E04C 2/543; B28B 23/0037; B28B 23/0056; B29C 39/10; B29K 2033/12; B29L 2007/002
See application file for complete search history.

(56) References Cited

U.S. PATENT DOCUMENTS 3,091,899 A * 6/1963 Bordlein ................... E04C 2/54
                                                              52/306
9,297,160 B2 * 3/2016 Cangiano .................. E04C 2/54
(Continued)

FOREIGN PATENT DOCUMENTS

EP    2179105    4/2010
EP    2604403    6/2013
(Continued)

*Primary Examiner* — Jessie T Fonseca
(74) *Attorney, Agent, or Firm* — Stetina Brunda Garred and Brucker

(57) ABSTRACT

The present invention relates to a method for making a composite panel comprising a pourable and settable base material, preferably cementitious mortar, and a plurality of through elements (10) made of glass for transmitting light between two base surfaces (1,1') of the panel (1). The method includes making a semi-finished product comprising a central body (50) which incorporates the through elements (10), which emerge from two mutually opposite main surfaces (51,52). In particular, the method includes making the semi-finished product by defining two containing frames, mutually opposite with respect to the body, each of which emerges from one of the central surfaces. The method includes closing the semi-finished product between two containing elements so as to define two half-spaces, each of which at least partially delimited by said containing frames. The method then includes filling each half-space with cementitious mortar and removing the manufactured item which is made, after the mortar has set. Finally, the method includes finishing such a manufactured item by eliminating
(Continued)

the containing frames from the semi-finished product, the body of which remains incorporated in the structure of the panel.

17 Claims, 17 Drawing Sheets

(51) Int. Cl.
| | |
|---|---|
| *B29C 39/10* | (2006.01) |
| *B29K 33/00* | (2006.01) |
| *B29L 7/00* | (2006.01) |
| *E04C 1/42* | (2006.01) |

(52) U.S. Cl.
CPC .......... *B29C 39/10* (2013.01); *B29K 2033/12* (2013.01); *B29L 2007/002* (2013.01); *E04C 1/42* (2013.01)

(56) References Cited

U.S. PATENT DOCUMENTS

| 9,782,913 | B2* | 10/2017 | Cangiano | E04C 2/044 |
|---|---|---|---|---|
| 10,241,252 | B1* | 3/2019 | Grzeskowiak, II | E04C 1/42 |
| 10,906,204 | B2* | 2/2021 | Van Delft Westerhof | E04C 2/288 |
| 2007/0074484 | A1* | 4/2007 | Yin | E04G 23/00 52/750 |
| 2010/0281802 | A1* | 11/2010 | Losonczi | B28B 7/364 52/307 |
| 2013/0084424 | A1* | 4/2013 | Cangiano | C04B 24/26 428/138 |
| 2014/0030479 | A1* | 1/2014 | Christandl | E04C 2/54 428/137 |
| 2014/0059952 | A1* | 3/2014 | Christandl | G02B 6/0001 52/173.1 |
| 2014/0333514 | A1* | 11/2014 | Dupont Skovsby | B28B 23/0037 345/82 |
| 2017/0072591 | A1* | 3/2017 | Carminati | E04C 2/54 |

FOREIGN PATENT DOCUMENTS

| EP | 2604766 | 6/2013 |
|---|---|---|
| WO | 2014184242 | 11/2014 |

* cited by examiner

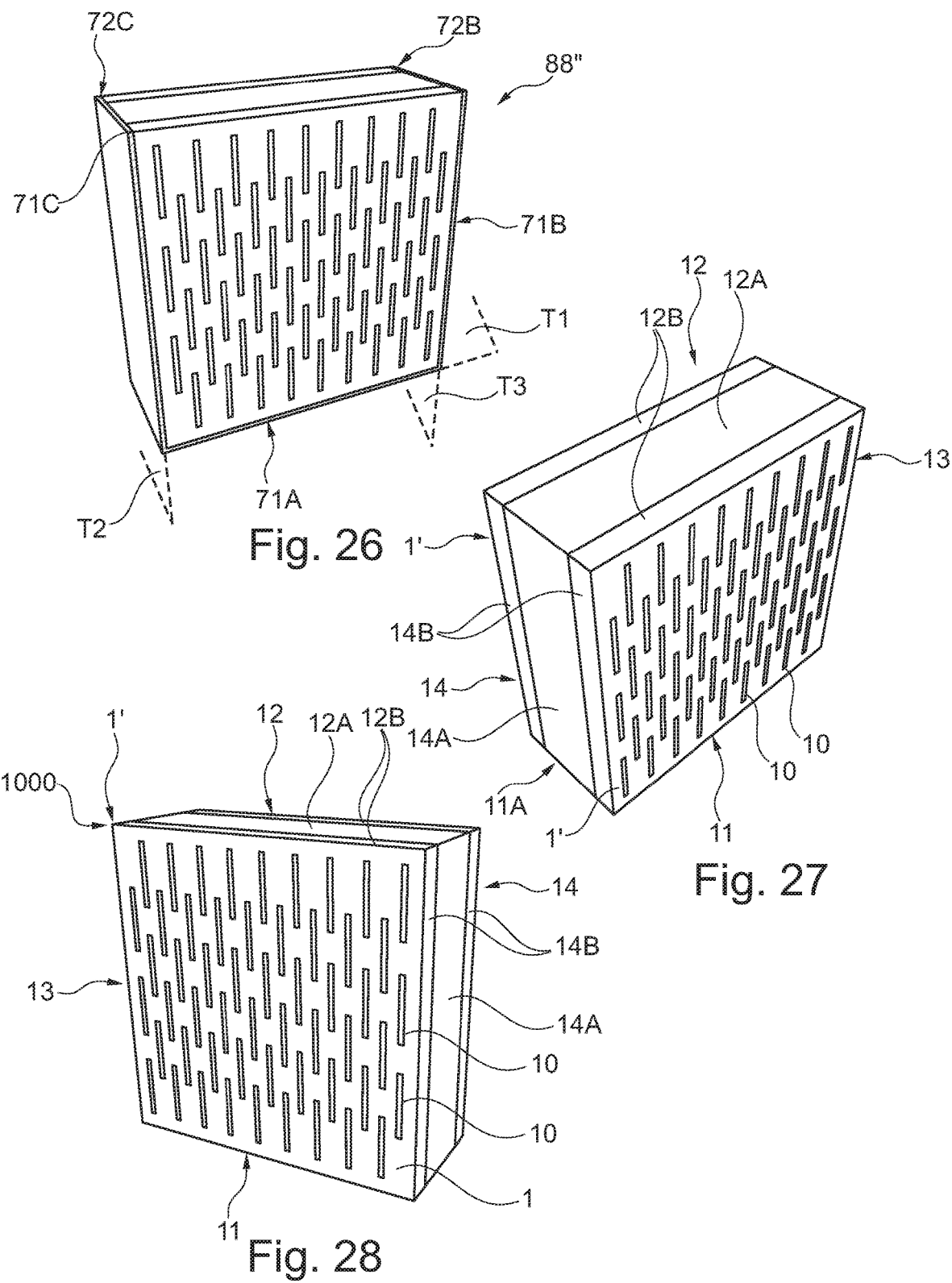

METHOD FOR MAKING A COMPOSITE PANEL, PREFERABLY CEMENTITIOUS MORTAR BASED, WITH LIGHT TRANSLUCENCY PROPERTIES

CROSS REFERENCE TO RELATED APPLICATION(S)

The present application claims priority to PCT International Application No. PCT/IB2018/053522 filed on May 18, 2018, which application claims priority to Italian Patent Application Nos. 102017000054669 filed May 19, 2017, the entirety of the disclosures of which are expressly incorporated herein by reference.

STATEMENT RE: FEDERALLY SPONSORED RESEARCH/DEVELOPMENT

Not Applicable.

FIELD OF THE INVENTION

The present invention relates to the scope of manufacturing composite panels with light translucency properties. In particular, the present invention relates to a method for making a new panel, a composite panel, e.g. cementitious mortar based, and a semi-finished product for a preferred embodiment of such a method. The present invention also relates to a new composite panel with light translucency properties obtainable through said manufacturing method.

BACKGROUND ART

The use of cementitious articles with light translucency properties are known. Among such manufactured items are those in the form of cementitious mortar composite panels comprising elements made of translucent transparent material. These elements are named "through elements" because they extend through the whole thickness of the panel so as to transmit light between its two opposite surfaces. Typically, these through elements are made of polymethylmethacrylate (PMMA) or alternatively of glass.

The patent application WO2015132287, for example, describes a method for the making a panel with through elements made of PPMA. This method provides for the use of a monolithic structure, by a plastic injection process, which defines a plurality of elements made of PMMA emerging from a lower base. The method includes placing this structure in a formwork and pouring cementitious mortar so that it is distributed between the elements in the PMMA. After the cementitious mortar sets, the cementitious manufactured item is removed from the formwork and finished by eliminating the lower base of the monolithic structure and taking the surfaces to the desired size.

The patent application WO 2014184242, instead, describes a method for making a composite panel with through elements made of PPMA. Such a method includes positioning glass sheets inside a formwork on parallel planes. Each sheet comprises a peripheral frame which supports the mutually separated longitudinal elements and have a shape corresponding to that provided for the through elements of the panel to be made. When the positioning of these sheets is completed, the method includes pouring the cementitious mortar inside the formwork so that it is distributed around the longitudinal elements defined by the plates. At the end of the setting process of the cementitious mortar, the manufactured item thus obtained is extracted from the formwork and roughed to eliminate the portions containing the peripheral frame of the sheets. In this manner, only the longitudinal elements remain incorporated in the cementitious mortar. The semi-finished product thus roughed is further sectioned, according to planes orthogonal to the axis of the longitudinal elements made of glass, so as to obtain prismatic portions of thickness substantially corresponding to that of the composite panel to be made. These portions are then finished in order to obtain the desired panel.

Patent application EP 2179105 describes another method for carrying out a cementitious mortar composite panel with through elements. Such a method includes carrying out one or more supporting structures made of plastic material which support the through elements in separated and distinct positions. Each of these structures has a substantially two-dimensional development and defines apertures for the passage of the mortar in the subsequent step of casting. The assembly formed by the supporting structure and the through elements is placed inside the formwork and locked on its bottom with fixing means. The cementitious mortar is then poured. At the end of the step of setting, the cementitious panel thus formed is extracted and possibly finished.

In all the methods described above, as in other substantially similar known, the final shape and size of the panel are established from the formwork in which the step of pouring is performed. The surfaces of the formworks deteriorate over time and this inevitably translates into a lower quality of the surfaces obtained by the formwork itself. So, with the traditional methods, in order to maintain an acceptable level of quality, the formworks must be frequently replaced. This aspect has a strong impact on the manufacturing cost of the panels.

Another drawback connected with the use of traditional formworks is the difficulty in positioning the elements which define the inner structure of the panel inside it. In particular, the positioning operations require very long times and cannot be automated in practice. These aspects are also extremely disadvantageous, especially for making panels on large scale.

In addition to the aforesaid drawbacks, the methods described above are absolutely not suitable for making composite panels with through elements made of glass. The request for this type of panels is however greatly on the rise because glass guarantees a better light transmission than that which can be obtained using through elements made of PMMA.

The method described in WO 2014184242, for example, shows several critical aspects, one of which is the complex structure to be assigned to the glass plates to be inserted in the formwork. Another critical aspect is in the high number of operations required to transform the product obtained at the end of the setting process, into panels of the desired shape and size. Indeed, such operations require the use of particularly complex machinery for handling and cutting and designed specifically for this process. The costs of such machines affect heavily on the final production costs of the panels.

The method described in EP 2179105 is also totally inappropriate for making composite panels with through elements made of glass. In particular, the use of a two-dimensional supporting structure appears disadvantageous especially during the step of casting of the cementitious mortar. The latter applies multiple thrusts on glass elements which tend to misalign the through elements with respect to the provided theoretical orientation. In many cases, these stresses cause the breakage of the glass elements and the consequent rejection of the panel. In general, it is seen that the method described in EP 2179105 causes a considerable number of rejects and poor-quality panels.

Given considerations above, it is the main object of the present invention to provide a new method for making a composite panel comprising a pourable and settable base material, e.g. cementitious mortar, and glass through elements to transmit the light radiation between two opposite surfaces of the panel. In the context of this task, it is a first object to provide a new method for making composite panels of the indicated type which overcomes the above-mentioned drawbacks of the prior art. It is a second object to provide a method for making composite panels which allows a greater control of the tolerances and thus a better quality of the panel. It is another object to provide a method particularly suited to make composite panels with through elements made of glass. It is yet another object of the present invention to provide a method for making composite panels which allows a large-scale manufacturing of composite panels while allowing to contain production waste. It is a not last object of the present invention to provide a method which is relatively easy to implement and allows a high production of composite panels at competitive costs.

SUMMARY

The present invention thus relates to a method for making a composite panel comprising a pourable and settable base material, preferably cementitious mortar, and a plurality of through elements made of glass for transmitting light between two base surfaces of the panel. The method according to the invention comprises the steps of:

making a semi-finished product comprising a body which incorporates a central part of said through elements, such a body defines a first main surface from which a first end part of the through elements emerges and a second main surface from which a second end part of the through elements emerges; such a semi-finished product is made by defining:

a first containing frame which emerges from the first main surface of the body and which extends about a first part of the perimeter of the first main surface, and, a second containing frame which emerges from the second main surface in position opposite to said first containing frame, with respect to said body of said semi-finished product;

closing the semi-finished product between a first containing element and a second containing element, each of which defining a closing surface, in particular the semi-finished product is arranged so as to define two half-spaces, each of which delimited by one of said closing surfaces, one of said main surfaces of said central body and one of said containing frames, and wherein each half-space is open at a second part of said perimeter which is different from said first part;

filling said half-spaces with said cementitious mortar;

following the setting of said cementitious mortar, extracting a manufactured item comprising said semi-finished product, a first main portion and a second main portion made of said cementitious mortar, wherein said main portions are opposite to each other with respect to the body of said semi-finished product;

finishing said manufactured item, preferably by using hot wire, so as to eliminate the containing portions of the semi-finished product.

The method according to the invention thus provides making a semi-finished product comprising containing frames which define some of the faces of the panel after pouring and successive setting. The formwork traditionally used for the pouring is therefore advantageously replaced by containing elements which define only the base surfaces of the panel. The containing frames allow a better control of the tolerances relating to the peripheral surfaces of the panel. At the same time, they are substantially "disposable" because they are eliminated during the step of finishing of the panel. Therefore, their use allows to solve the problems of managing traditional formworks. Unlike traditional solutions, the method according to the invention can be advantageously automated with the advantage of a reduction of production costs.

LIST OF DRAWINGS

Further features and advantages will become apparent from the following detailed description of the method of making the cementitious manufactured item according to the present invention shown by way of non-limiting example by means of the accompanying drawings, in which:

FIG. 26 is a perspective view and a view of a manufactured item obtained by using a semi-finished product in FIGS. 24 and 25 in a method according to the invention;

FIGS. 27 and 28 are perspective views of a composite panel which can be obtained through a method according to the present invention in which the semi-finished product shown in FIGS. 24 and 25 is used.

The same reference numbers and letters in the figures refer to the same elements or components.

DETAILED DESCRIPTION

Figure 1:
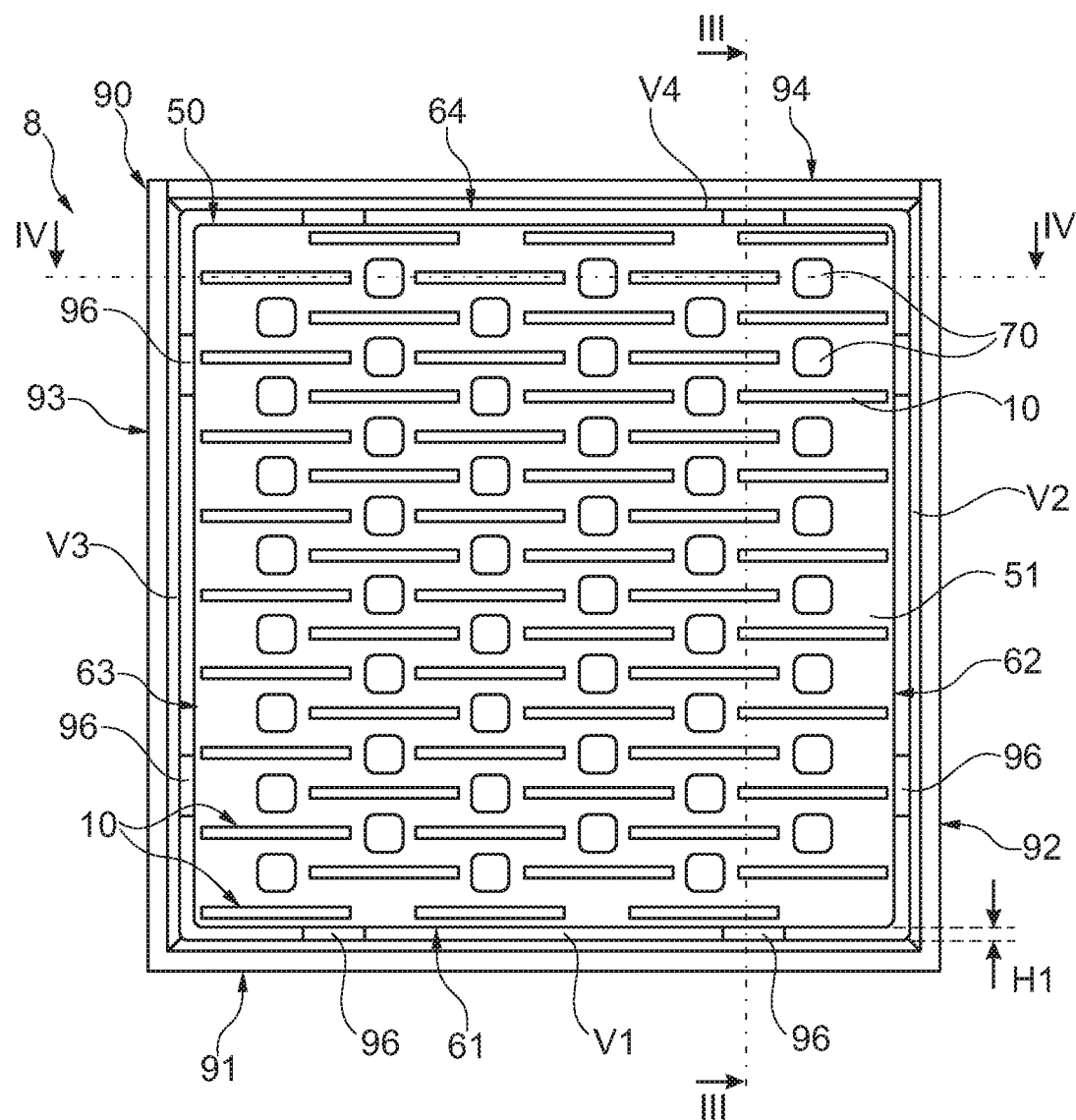
FIG. 1 and FIG. 2 are a front view and a perspective view of a semi-finished product which can be used for implementing a method according to the invention, respectively.
Figure 2:
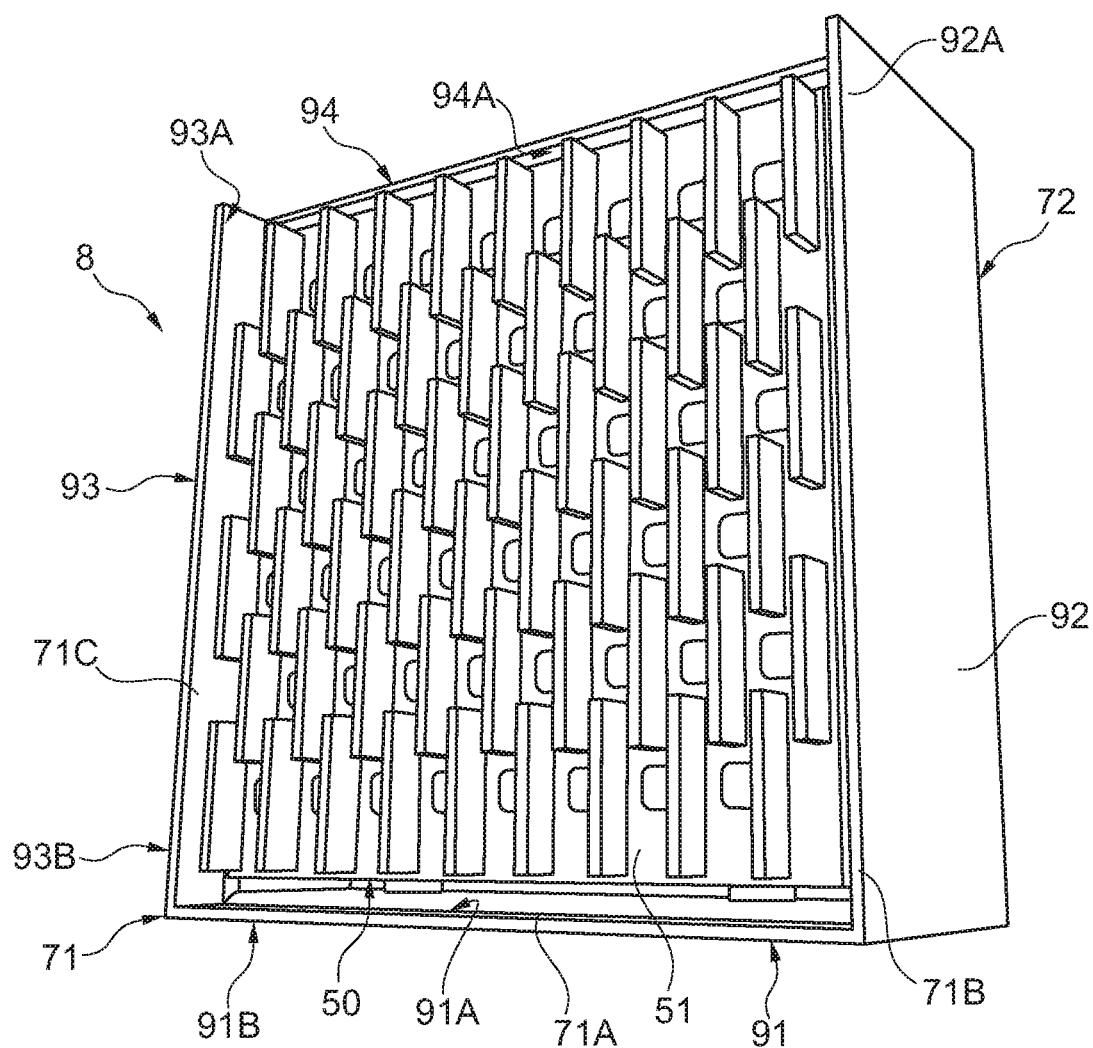

The present invention thus relates to a method for making a composite panel 1 comprising a pourable and settable base material, e.g. cementitious mortar, and comprising a plurality of through elements 10 to transmit light from a first base surface 1' to a second base surface 1'', which is opposite to said first surface 1'. The two base surfaces 1',1'' extend on parallel planes. The panel 1 further defines peripheral surfaces 11,12,13,14 which extend orthogonally to the two base surfaces 1',1'' (see FIG. 9). In particular, the panel 1 comprises a first peripheral surface 11 and a second peripheral surface 12, which are mutually opposite and extend orthogonally to the two base surfaces 1',1''. The panel 1 also defines a third peripheral surface 13 and a fourth peripheral surface 14, which are mutually opposite and which extend orthogonally to the other peripheral surfaces 1',1'',11,12 defined above. FIGS. from 9 to 12 and FIGS. 27 and 28 show possible embodiments of a composite panel which can be obtained by the method according to the present invention.

The method according to the invention is based on the use of a semi-finished product 8,8',8'', preferably made by sintering a heat-expanding plastic material in a mold, the structure of which comprises a substantially prismatic shape central body 50. Such a central body 50 incorporates a central part 15 of a plurality of transparent and/or light-conducting through elements 10, preferably made of glass, which extend along a reference direction 101. The central body 50 defines a main surface 51 from which a first end part 16 of the through element 10 emerges and a second main surface 52 from which a second end portion 17 of said through elements 10 emerges. The two main surfaces 51,52 have a substantially rectangular configuration.

According to the present invention, the semi-finished product 8,8',8'' comprises at least one first containing frame 71 and at least one second containing frame 72 which are connected, either directly or indirectly, to the central body 50 and substantially opposite each other with respect to the body itself. In particular, the first containing frame 71 emerges with respect to said first main surface 51 according to a direction parallel to the reference direction 101 (identified by the through elements 10) facing said first end part 16 of said elements 10.

Similarly, the second containing frame 72 emerges with respect to said first main surface 52 according to a direction parallel to the reference direction 101 (and in opposite direction to said first containing surface 71), facing said second end part 17 of said elements 10.

The two containing frames 71,72 extend along three sides of the rectangular shape of the two main surfaces 51,52. In particular, the second containing frames 71 extends along three sides corresponding to those along which the second containing frame 72 extends. In other words, the first containing frame 71 is substantially opposite to the second containing frame 72 with respect to the central body 50.

The method according to the invention then includes closing said semi-finished product 8,8',8'' between a first containing element 81 and a second containing element 82, each of which defines a main closing surface 81A,82A. In particular, the semi-finished product 8,8',8'' is interposed between the two containing elements 81,82 so that each main closing surface 81A,82A is opposite to a corresponding main surface 51,52 of the central body 50 so that each closing surface 81A,82A abuts against the edge of a corresponding one of said containing frames 71, 72. In this manner, a first half-space 9A is defined between the first closing surface 81A and the first main surface 51 of the central body 50 of the semi-finished product 8,8',8'' and a second half-space 9B between the second closing surface 82A and the second main surface 52 of the central body 50 of the semi-finished product 8,8',8''. In particular, the first half-space 9A is laterally delimited along three peripheral sides by the first containing frame 71, while the second half space 9B is laterally delimited by the second containing frame 72 along the same three peripheral sides on which is delimited the first half space 9A. Each half-space 9A, 9B is open on one side, not limited by the corresponding containing frame 71,72.

The method according to the invention comprises the step of casting pourable and settable material in two half-spaces 9A,9B, whereby exploiting its open side, up to fill it completely. According to a preferred embodiment of the invention, the central body 50 may advantageously comprise passages 70 defined between the two main surfaces 51,52. In this manner, during the step of pouring, the first half-space 9A advantageously communicates with the second half-space 9B. This condition promotes the distribution of material between the two half-spaces 9A,9B and in particular the pushes on the semi-finished product 8,8',8'' generated by the material itself.

So, the method according to the invention provides extracting a manufactured item 88,88' comprising said semi-finished product 8,8',8'' made of plastic material following the setting of said pourable material. Such a manufactured item 88,88' comprises at least one first main portion 21 and one second main portion 22, mutually opposite with respect to the central body 50 of the semi-finished product 8, made of the base material. Such main portions 21,22 are surrounded, along three sides by a corresponding containing frame 71,72 of the semi-finished product 8,8',8''.

The method according to the invention finally provides the step of finishing said manufactured item 88,88' by eliminating the two containing frames 71,72 to obtain the desired panel 1. For this purpose, the elimination of the two frames 71,72 made of plastic material is preferably performed by means of a hot wire cutting procedure or by any other functionally equivalent method.

Advantageously, the size of the two main portions 21,22 of the composite panel are defined by the two containing frames 71,72 which close around the perimeter of the two half-spaces 9A,9B into which the base material is poured. With respect to the known solutions, in which the base material is poured in a mold, the method according to the invention allows a greater control of tolerances and thus a better quality of the composite panel 1. At the same time, by effect of the shape of the semi-finished product 8,8',8'' the positioning of the through elements 10 is much more precise than the traditional solutions. Indeed, during the step of pouring, through elements 10 are not displaced because they are advantageously incorporated in the central body 50 of the semi-finished product 8,8',8''.

FIGS. from 1 to 8 relate to a first embodiment of a method according to the present invention. In particular, FIGS. from 1 to 4 show in detail the structure of a semi-finished product 8 which may be used for implementing the method. Such a semi-finished product 8 thus comprises a central body 50 which defines two main surfaces 51,52 and four side surfaces 61,62,63,64 according to a substantially prismatic configuration. More precisely, a first side surface 61, a second side surface 62 orthogonal to said first side surface 61, a third side surface 63, parallel to said second side surface 62 and a fourth side surface 64 parallel to said first side surface 61 and therefore orthogonal to said second side surface 62 and said third side surface 63 can be identified in the central body 50. It falls within the scope of the present invention the possibility that the central body 50 has a different shape from the one just described above.

The extension of the central part 15 of the through elements 10 incorporated in the central body 50, is greater than the extension of the first part 16 and/or of the second part 17 of end defined above. The extension of the parts 15,16,17 of the elements 10 is evaluated along a reference direction 101 substantially orthogonal to the planes 510,520 along which the main surfaces 51,52 of the central body 50 extend. This dimensional relationship between the parts 15,16,17 is shown, for example, in the section views in FIG. 4.

Preferably, moreover, the extension of the first end part 16 and/or of the second end part 17, of at least one of said through elements 10 (preferably of all elements), is between 5% and 25% of the extension of the element itself, extension evaluated again along the reference direction 101 defined above. Even more preferably, the extension of the first end part 16 and/or of the second end part 17, of at least one of said through elements 10 (preferably of all elements), is between 10% and 20% of the extension of the element itself.

With reference again to FIGS. 1 to 6, said semi-finished product 8 comprises a peripheral containing structure 90 comprising a first rib 91, a second rib 92, a third rib 93 and a fourth rib 94. Said ribs 91,92,93,94 are connected to one another so that the peripheral structure 90 extends about the central body 50. Each of said ribs 91,92,93,94 is connected to the central body 50 and extends in a position facing and spaced from a corresponding side surface 61,62,63,64 of central body 50. The expression "facing and spaced" indicates a condition such that an air gap V1, V2, V3, V4, intended to be successively filled with pourable material, is defined between one of said ribs 91,92,93,94 and the corresponding side surface of the central body 50. More precisely, following the setting of the pourable material, a peripheral portion of the composite panel forms/solidifies in this space according to a principle which is described in greater detail below.

The first peripheral rib 91 emerges from the plane 510 on which the first surface 51 of the central body 50 extends and defines a first portion 71A of the first containing frame 71. Similarly, the first peripheral rib 91 also emerges from the plane 520 on which the second surface 51 of the central body 50 extends, whereby defining a first portion 72A of the second containing frame 72. More precisely, the first rib 91 emerges from the indicated planes 510, 520 according to a direction parallel to the reference direction 101. In this manner, the first portion 71A and the second portion 72A, respectively of the first containing frame 71 and of the second containing frame 72, are positioned respectively facing the first end portion 16 and the second end part 17 of the elements 10.

Similarly, also the second peripheral rib 92 emerges (according to a direction parallel to the reference direction 101) with respect to the plane 510 on which the first surface 51 of the central body 50 extends and defines a second portion 71B of the first containing frame 71. The second rib 92 (again considering the reference direction 101) also with respect to the plane 520 on which the second surface 51 of the central body 50 extends, whereby defining a second portion 72B of the second containing frame 72.

The third rib 93, opposite to the second rib 91 with respect to the central body 50, also emerges (according to a direction parallel to the reference direction 101) with respect to the plane 510 on which the first surface 51 of the central body 50 extends whereby defining a third portion 71C of the first containing frame 71. The third rib 93 further defines a third portion 72C of the second containing frame 72 emerging (according to the reference direction 101) also with respect to the plane 520 on which the second surface 52 of the central body 50 extends.

So, as a whole the first containing frame 71 is defined by three portions 71A,71B,71C continuously connected to one another and each of which is defined by a corresponding one of said peripheral ribs 91,92,93. So, these portions 71A,71B, 71C face the first part 16 of the ends of the elements 10. Similarly, as a whole, the second containing frame 72 is defined by three portions 71A,71B,71C connected to one another in a continuous manner, each of which is defined by a corresponding one of said peripheral ribs 91,92,93. Therefore, the three portions 72A,72B,72C of the second containing frame 72 face the second end part 17 of the through elements 10.

According to another aspect, the three containing ribs 91,92,93 are configured so that the edges of the three portions 71A,71B,71C of the first containing frame 71 extend on a plane (indicated by T1 in FIG. 4) substantially parallel to the plane 510 on which the first main surface 51 extends. Such a plane T1 is preferably located at a distance from the plane 510 just slightly greater than the length (evaluated along the reference direction 101) of the first part 16 of the ends of the elements 10.

At the same time, the three containing ribs 91,92,93 are configured so that the edges of the three portions 71A,71B, 71C of the second containing frame 72 extend on a further plane (not shown) substantially parallel to the plane 530 on which the second main surface 52 extends. Such a further plane is preferably located at a distance from the plane 530 just slightly greater than the length (evaluated along the reference direction 101) of the second part 17 of the ends of the through elements 10.

Figure 3:
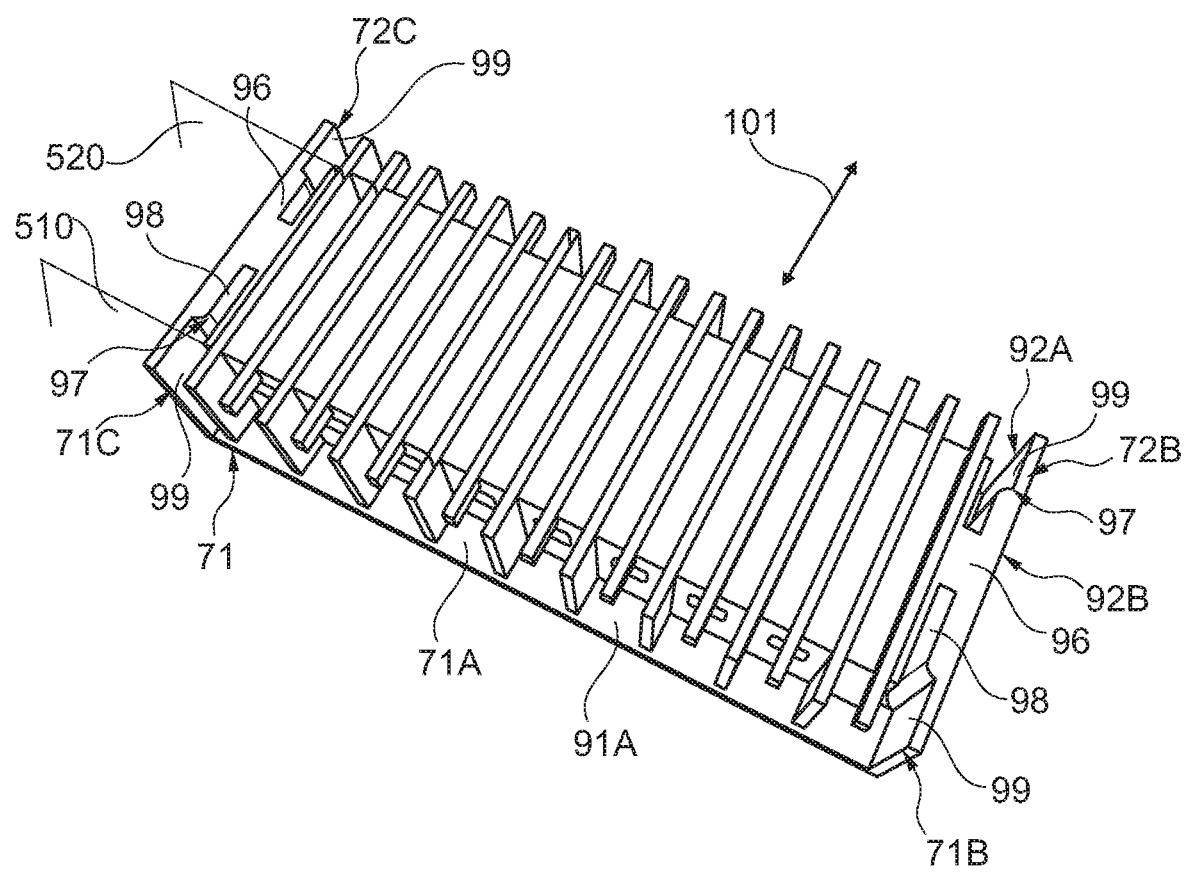
FIGS. 3 and 4 are section views taken along section plane and section plane IV-IV in FIG. 1, respectively.
Figure 4:
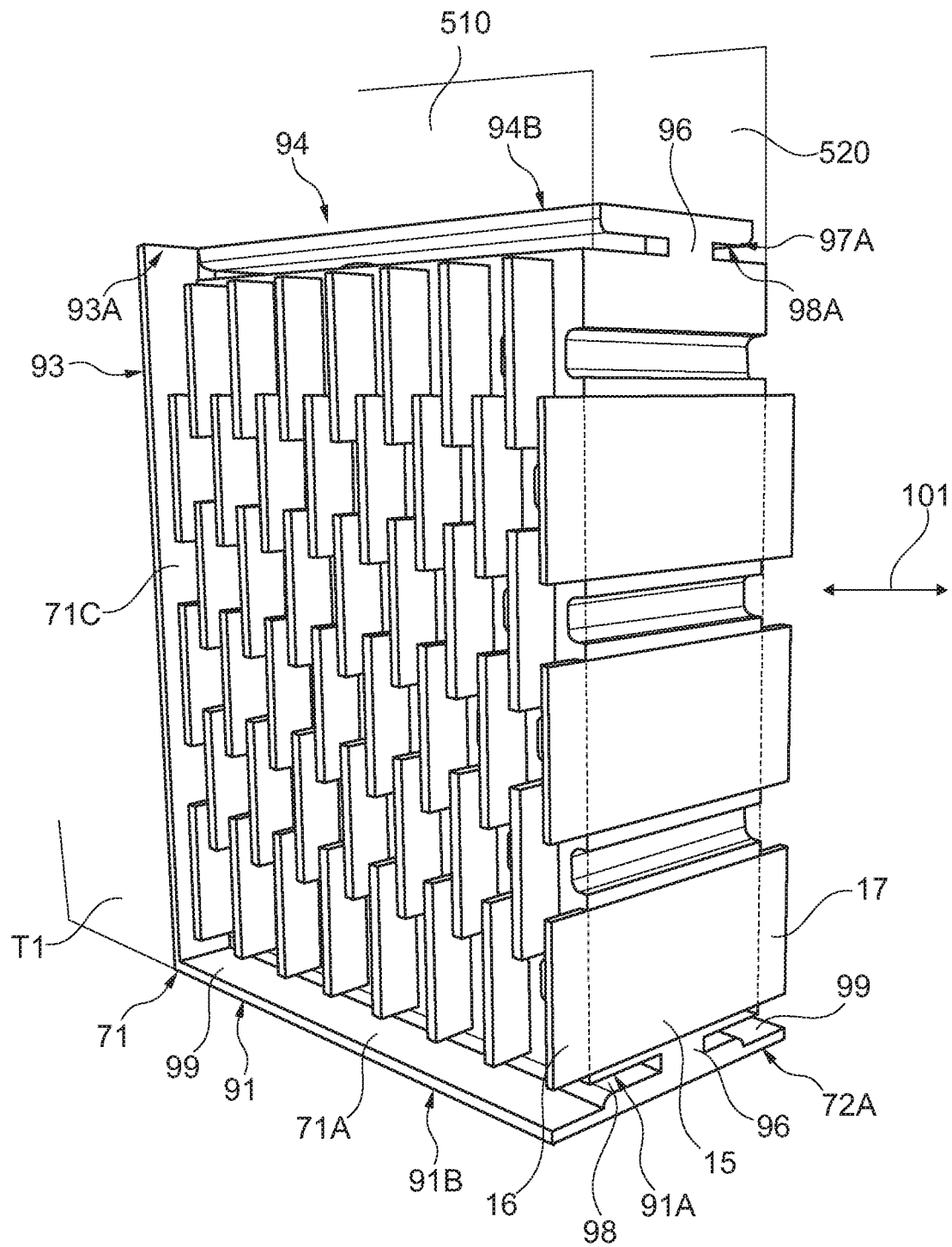

FIGS. 3 and 4 are sectional perspective views showing further aspects of the semi-finished product 8. In particular, it can be observed that the fourth peripheral rib 94 extends in a position facing and spaced from the fourth peripheral surface 64 of the central body 50 without emerging from the main surfaces 51,52 of the body itself. As for the three ribs 91,92,93 described above, the space V4 between the fourth rib 94 and the fourth surface 64 of the central body 50 has the purpose of defining a side portion of the composite panel 1. The conformation of the fourth rib 94, not emerging from the main surfaces 51,52, actually defines an interruption zone of the containing frames 71,72, useful for casting the pourable material inside the two half-spaces 9A,9B, which are formed inside the two containing elements 81, 82 upon insertion of the semi-finished product 8.

According to another aspect, each of the peripheral ribs 91,92,93,94 is connected to a corresponding side surface 61,62,63,64 of the central body 50 (facing the peripheral rib itself) through one or more connecting portions 96. Preferably, a plurality of connecting portions 96, preferably cylindrical-shaped, is provided for each peripheral rib. In practice, the connecting portions 96 allow the peripheral ribs 91,92,93,94 to maintain the position facing and spaced from the corresponding side surfaces 61,62,63,64 of the central body 50. As described in greater detail below, these connecting portions 96 remain incorporated in a side portion 31,32,33,24 of the composite panel 1 after the step of casting and setting.

According to a further aspect, each peripheral rib 91,92, 93,94 identifies an inner side 91A,92A,93A,94A, facing the corresponding side surface 61,62,63,64 of the central body 50, and an outer side 91B,92B,93B,94B which is opposite to said inner side 91A,92A,93A,94A. With reference to the first rib 91, the second rib 92 and the third peripheral rib 93, the corresponding inner side 91A,92A,93A comprises a central surface portion 98 defined by the central portion of the containing rib 91A,92A,93A and two coplanar surface portions 99 which are opposite to said central portion 98. Preferably, for each of the three ribs 91,92,93 the central surface portion 98 extends on a plane, the distance H1 of which from the corresponding side surface 61,62,63,64 of the central body 50 is less than the distance between the plane on which said coplanar surfaces 99 extend and the side surface 61,62,63,64 itself. Preferably, the surface central portion 98 is connected to the two coplanar surfaces 99 through connecting surfaces 97 which preferably have a predetermined curvature or chamfer (see FIG. 3). This particular conformation has the purpose of generating a recessed central part in corresponding side portion of the panel which is formed (after the material is poured and set) between each peripheral rib 91,92,93,94 and the corresponding side surface 61,62,63,64 of the central body 50 which the rib itself faces.

With reference to the fourth rib 94 along the perimeter, the inner side is defined by a single surface 98A, the shape and size of which correspond to those of the central surface portion 99 of the inner side of each of the other peripheral ribs 91,92,93 (see FIG. 3). In particular, said single surface 98A of the inner side 94A of the fourth rib 94 extends on a plane spaced from the fourth surface 64 by the joined toward the outer side 94B through two connecting surfaces 97A, preferably of curvature or chamfer corresponding to that of the jointing surfaces provided for the other ribs 91,92,93 described above. As shown above, the distance between the central portion 98,98A of the inner side 91A,92A,93A,94A and the corresponding side surface 61,62,63,64 is thus the same for all perimeter ribs 91,92,93,94.

Figure 13:
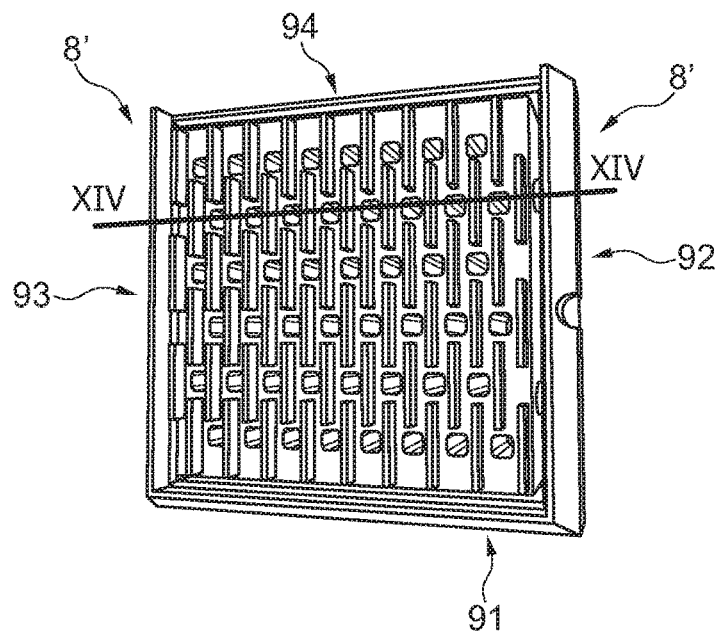
FIG. 13 is a view related to a second possible embodiment of a semi-finished product which can be used in a method for carrying out composite panels according to the present invention.
Figure 14:
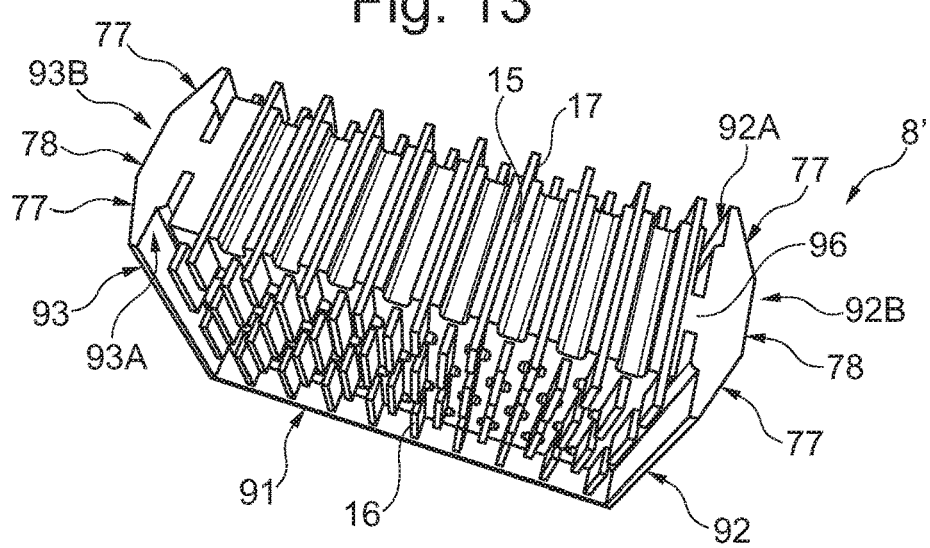
FIGS. 14 and 15 are perspective and plan section views, taken along the section plane XIV in FIG. 13, respectively.
Figure 15:
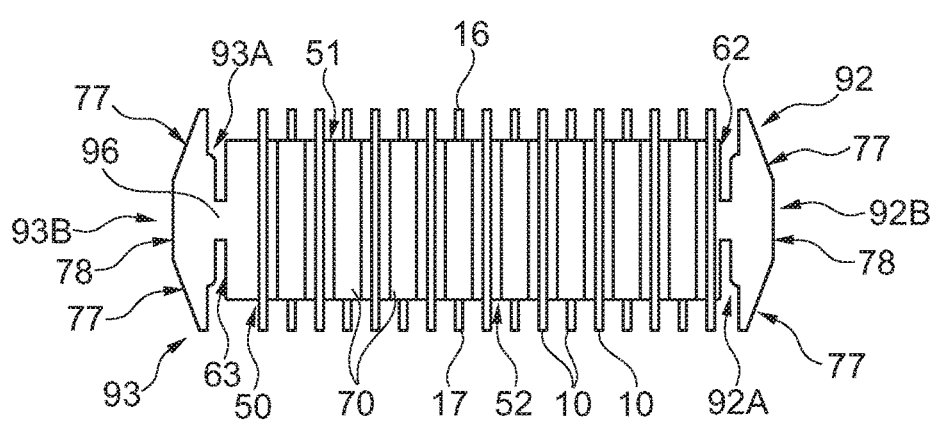

In the embodiment shown in the FIGS. from 1 to 4, the outer side 91B,92B,93B,94B of the peripheral ribs 91,92, 93,94 extends on a plane substantially parallel to the planes on which the surfaces of the corresponding inner side 91A,92AB,93A,94A extend. However, the outer side 91B, 92B,93B,94B may also assume different embodiments. In the embodiment shown in FIGS. 13 and 15 and described below, the outer side 91B,92B,93B,94B has a different shape, suited to facilitate the extraction of the set manufactured item 88 from the containing elements 111,121, as described in greater detail below.

Figure 11:
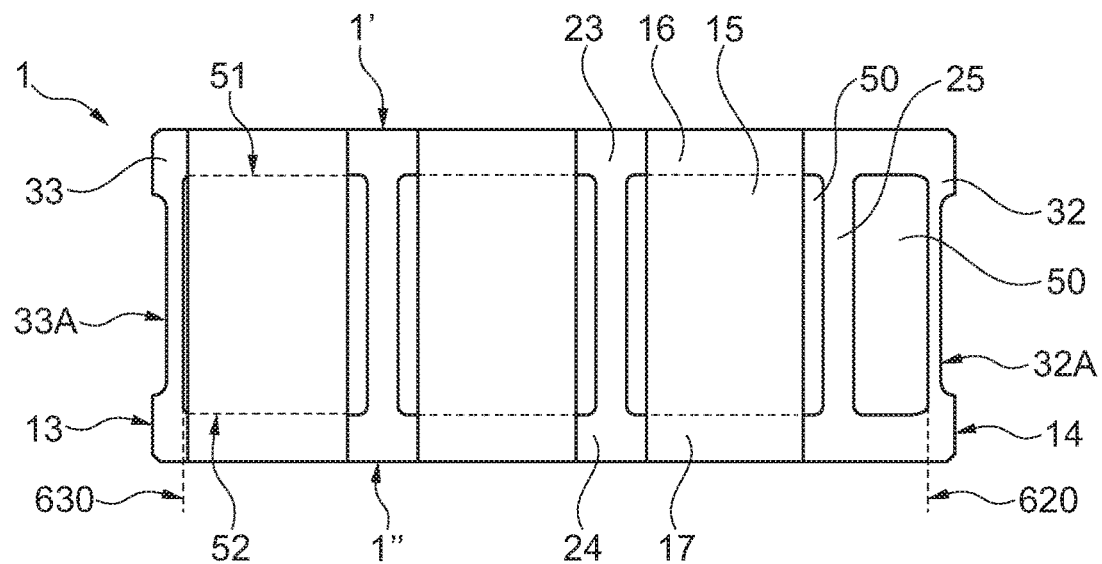
FIGS. 11 and 12 are section views taken along plane XI and plane XII in FIG. 10, respectively.

As mentioned above, in a preferred embodiment, the central body 50 further defines passages 70 which extend for the whole thickness of the central body 50, i.e. of the distance between the first main surface 51 and the second main surface 52, evaluated along the reference direction 101. In the step of pouring for making the composite panel 1, the passages 70 advantageously allow the cementitious mortar to spread in optimal fashion within the gaps 9A,9B defined between the semi-finished product and the two containing elements 81,82. At the same time, following the setting of the material, the material which sets inside the passages 70 defines the through portions 25 which connect two opposite main portions 23,24 of the panel 1, each of which defines one of the surfaces of the base 1',1" of the panel itself (see FIGS. 11 and 12).

According to a possible, thus not exclusive, embodiment shown in the figures (see for example FIG. 4), the passages 70 have a substantially constant cross-section along their whole extension between the first main surface 51 and the second main surface 52 of the central body 50. Such a cross-section is evaluated according to a reference plane orthogonal to the reference direction 101 defined above. Again, in the example shown in the figures, the cross-section of the passages 70 is substantially square with rounded corners. The possibility of providing passages 70 with cross-section of different conformation is within the scope of the present invention.

Again according to a preferred, but not exclusive embodiment, the passages 70 are preferably defined so as to be uniformly distributed inside the central body 50 of the semi-finished product 8. In the possible, but not exclusive embodiment shown in the figures, the through elements 10 are arranged along "staggered rows" as shown above, each passage 70 is defined in the separation space between two through elements belonging to the same row and/or between two elements facing each other and belonging to files of elements which are not adjacent.

In the embodiment shown in the figures, the through elements 10 have a cross-section, evaluated according to a plane orthogonal to the reference direction 101. However, the through elements holes may have a different cross-section and a distribution inside the central body 50 from those described above.

Figure 5:
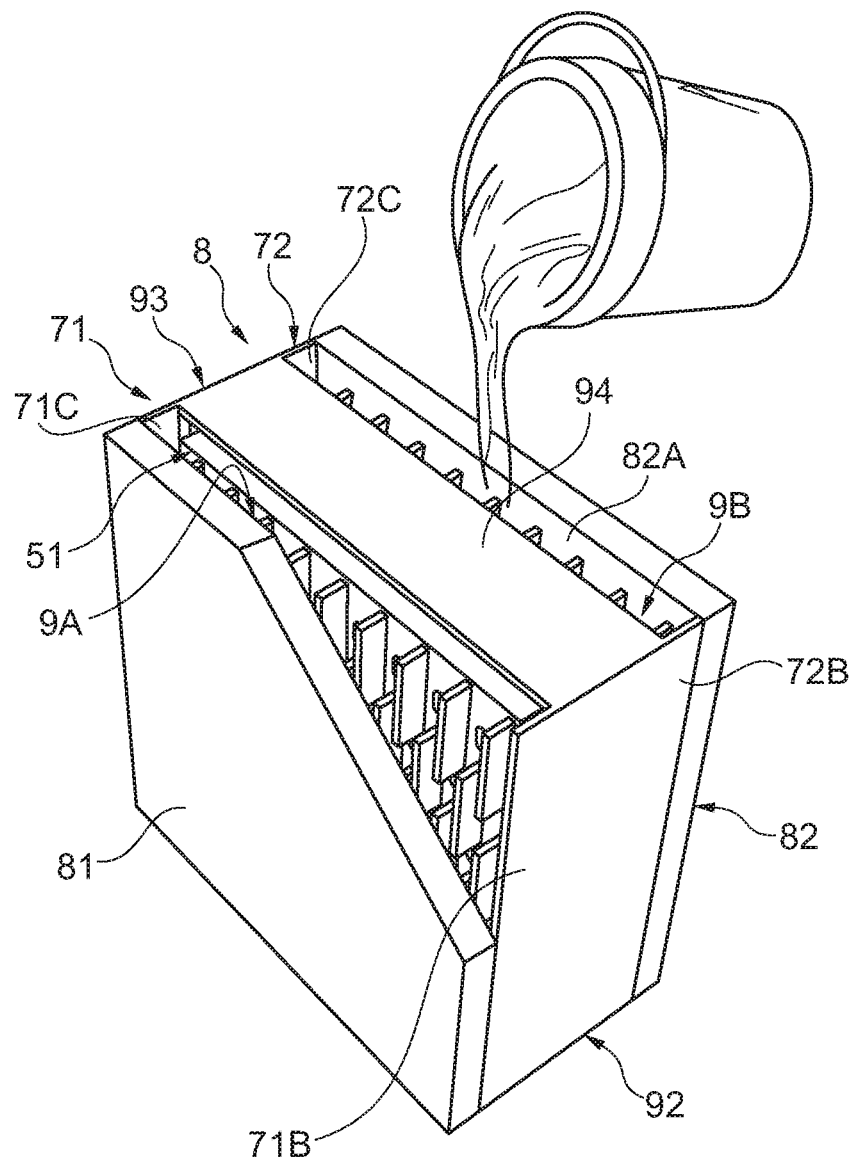
FIG. 5 is a diagrammatic view related to an operative step of pouring of the method according to the present invention.
Figure 6:
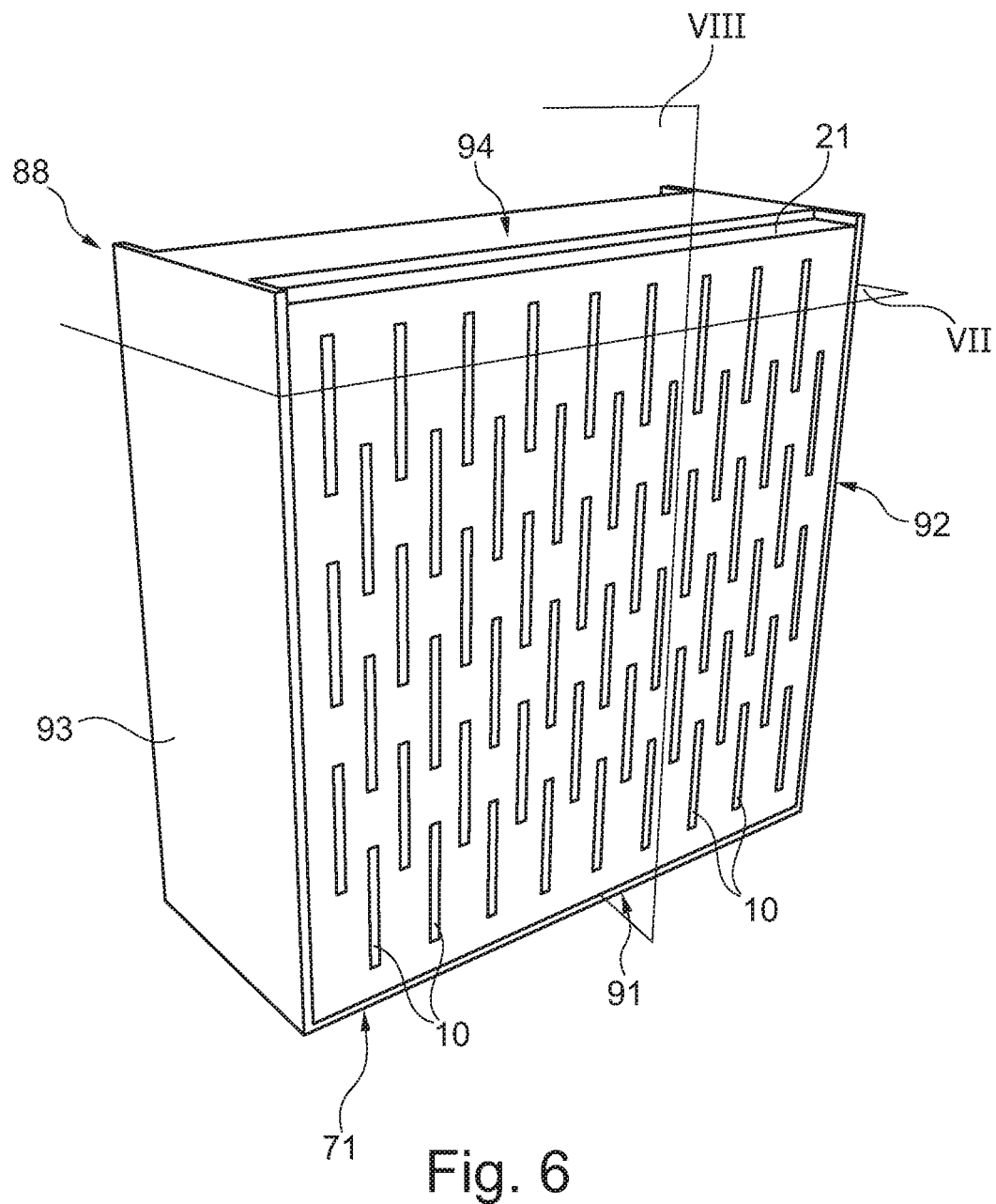
FIG. 6 is a perspective view of a manufactured item obtained following the step of pouring in FIG. 5.

FIG. from 5 to 8 shows further steps of the method according to the invention. In particular, FIG. 5 is a schematic figure which relates to the step of pouring. In accordance with the method according to the invention, the semi-finished product 8 is interposed between a first containing element 81 and a second containing element 82, each of which defines a closing surface 81A,82A which faces a corresponding main surface 51,52 of the central body 50. More precisely, each of the closing surfaces 81A,82A rests against the edge of the corresponding end part 16,17 of the through elements 10 which emerges from the central body 50. By virtue of such an arrangement, a first space 9A is defined between the closing surface 81A and the first main surface 51 of the central body 50 and a second space 9B is defined between the second closing surface 82A and the second main surface 52 of the central body 50. The first half-space 9A is laterally surrounded by three portions 71A,71B,71C of the first containing frame 71, each of which is defined by the three peripheral ribs 91,92,93. Similarly, the second half space 9B is laterally delimited by the three portions 72A,72B,72C of the second containing portion 72, also defined by a corresponding one of the three ribs 91,92,93. Each space 9A,9B is thus open on the side identified by the fourth containing rib 94, the structure of which does not emerge with respect to the main surfaces 51,52 of the central body 50. The settable material can be poured on such an open side.

In the preferred case in which the central body 50 has passages 70 discussed above, the material may be poured in only one of the two spaces 9A,9B which communicate precisely through these passages 70. It is worth noting that by effect of the conformation of the peripheral ribs 91,92, 93,94, and more precisely because of their position spaced from the central body 50, the poured material is also distributed in the spaces V1, V2, V3, V4 between the inner side 91A,92A,93A,94A of each peripheral rib 91,92,93,94 and the corresponding peripheral surface 61,62,63,64 of the central body 50 which the rib faces.

With reference again to FIG. 5, preferably the pouring step continues until the inner level of the poured material reaches the inner side 94A of the fourth rib 94.

Figure 7:
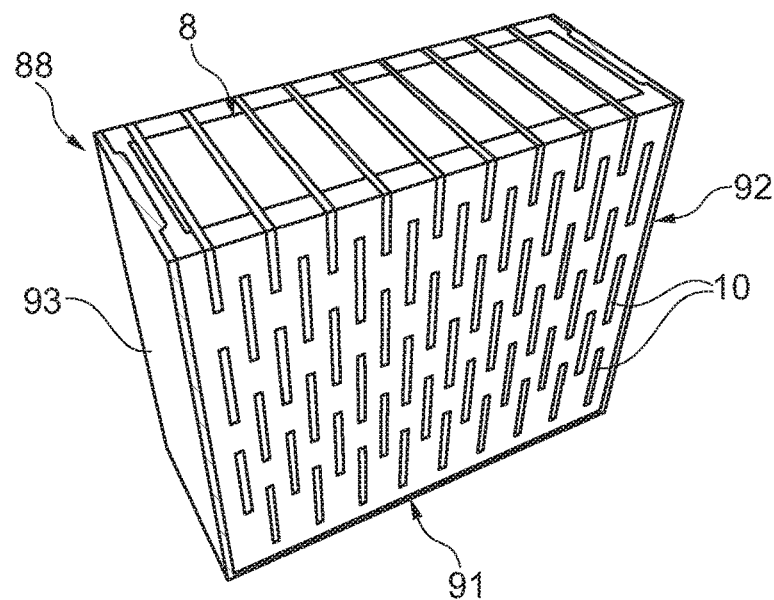
FIGS. 7 and 8 are section views taken along plane VII and plane VIII in FIG. 6, respectively.
Figure 8:
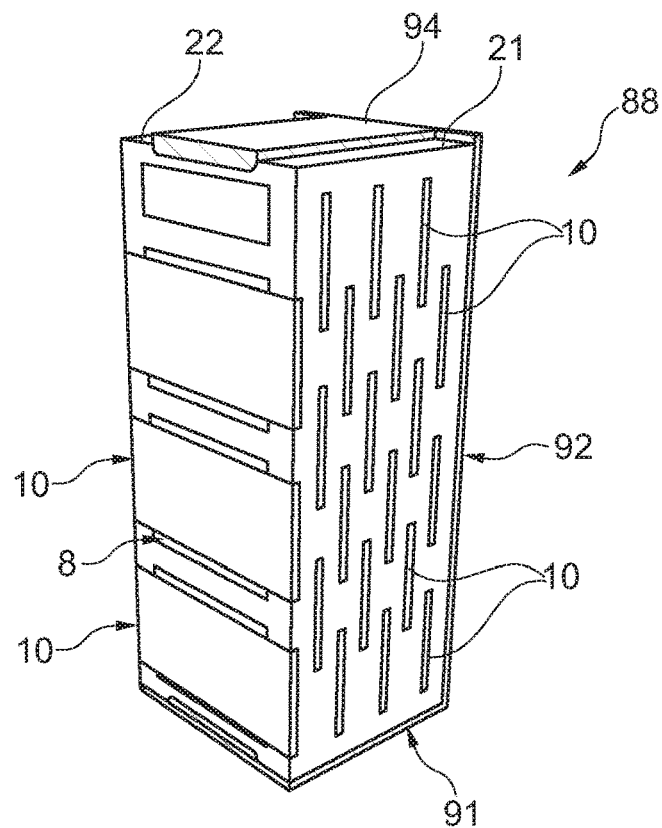

The setting of the poured material (also known as curing) leads to the formation of a set manufactured item (see FIG. 6), which is extracted from the containing elements 81,82 indicated above. This set manufactured item 88 incorporates the central body central 50 of the semi-finished product 8 and is subjected to a step of finishing in order to obtain the composite panel 1. Preferably, said step of finishing is performed by using a hot wire guided so as to eliminate the peripheral ribs 91,92,93,94. In this regard, FIGS. 7 and 8 are section views taken along mutually orthogonal plane VII and plane VIII in FIG. 6. In FIG. 8, the peripheral ribs 91,92,93,94 are shown by a dashed line to illustrate the profile with respect to the rest of the semi-finished product 8 (central body 50 and connecting portions 96) intended instead to remain incorporated inside the composite panel 1. In particular, the connecting portions 96 remain incorporated in corresponding side portions of the composite panel thus obtained.

FIGS. from 9 to 12 shown the composite panel 1 which are obtained at the end of the step of finishing just described above. With reference to the section views in FIGS. 11 and 12, the central body 50 of the semi-finished product 8 remains incorporated inside the composite panel 1. In this regard, the central part 15 of each of the through elements 10 is incorporated in the central body 50, while the first end portion 16 and the second end portion 17 of the through elements 10 are incorporated in the corresponding main portions 23,24 of the composite panel 1 defined by the set material. Such main portions 23, 24 are connected to each other by a plurality of through portions 25, also made of settable material, which extend through the central body 50 following the pouring of material according to that shown above. In general, the central body 50 made of plastic material occupies a volume portion of the panel 1 greater than the volume portion occupied by the base material. This translates into an advantageous reduction of the composite panel 1 and thus in an easier transportability thereof, especially if the base material consists of cementitious mortar or other material with similar specific weight.

At the same time, the two main portions 23,24 and the through portions 25 in the set material form a substantially self-supporting structure inside which the structure 5 made of a heat-expanded material remains forced. In the case in which, for example, the base material is cementitious mortar, it has been seen that the size and shape of the through elements being the same and less cementitious mortar being used, a panel according to the invention has sufficient mechanical properties to be used in the same conditions of a traditional panel.

Again with reference to FIGS. 9 to 12, it can be observed that the first main portion 23 made of cementitious mortar of the panel 1 is between the first base surface 1' of the panel itself and the first main surface 51 of the central body 50. Similarly, the second main portion 24 made of cementitious mortar remains between the second base surface 1" of the panel 1 and the second main surface 52 of the central body 50. The planes 510,520 on which the two main surfaces 51,52 of the central body 50 lie are indicated with dashed lines in FIG. 4.

The panel 1 also comprises a least one first side portion 31 and a second side portion 32, opposite with respect to the central body 50 and both made of the set base material. In particular, the first side portion 31 extends between the first outer surface 11 of the panel 1 and the first side surface 61 of the central body 50, while the second side portion 32 extends between the second peripheral surface 12 of the panel 1 and the fourth side surface 64 of the central body 50.

Figure 12:
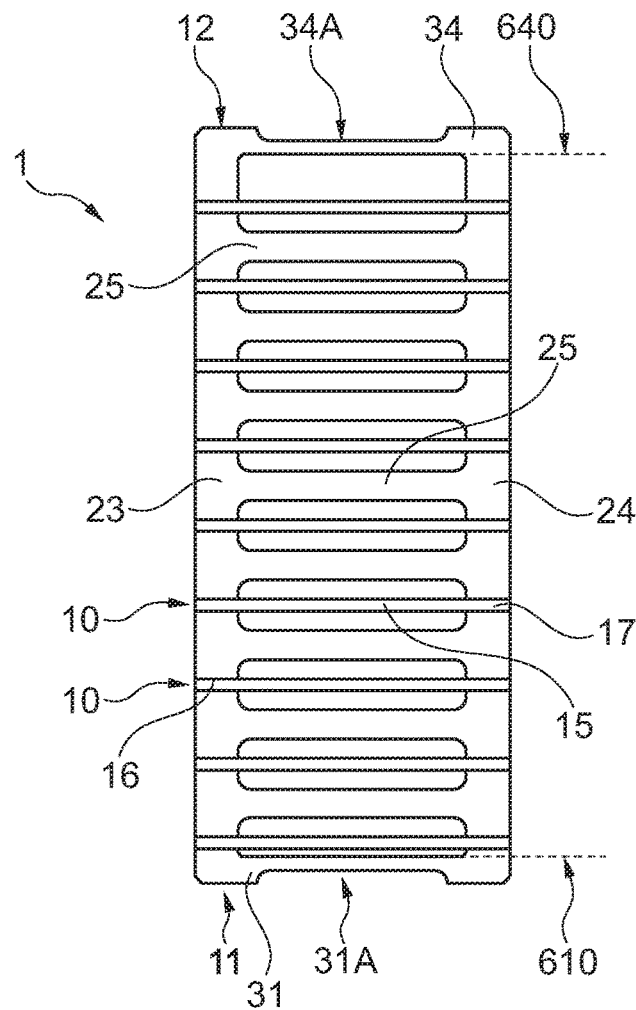

FIG. 12 shows (with dashed line) the planes 610,640 on which the two side surfaces 61,64 (first and fourth) of the central body 50 lie.

The panel 1 also comprises a least a third side portion 33 and a fourth side portion 34, opposite to the central body 50 and both made of the set base material. In particular, the third side portion 33 extends between the third peripheral surface 13 of the panel 1 and the third side surface 63 of the central body 50, while the second side portion 34 extends between the fourth outer surface 14 of the panel 1 and the second side surface 62 of the central body 50. As a whole, the main portions 23,24 and the side portions 31,32,33,34 define a box-like structure which surrounds and encloses the central body 50 isolating it completely. Advantageously, all portions 23,24,25,31,32,33,34 made of base material are advantageously defined within a same step of pouring.

It is worth noting that the side portions 31,32,33,34 of the composite panel 1 define a central cavity 31A,32A,33A,34A which extends over the whole length of the portion itself (length assessed according to a direction orthogonal to that of reference 101). In detail, each of the peripheral surfaces 11,12,13,14 of the composite panel 1 comprises two outermost parts 197, coplanar on an outermost plane, and a central part 198 which extends on an innermost plane. In the central cavity 31A,32A,33A,34A of one or more of the side portion 31,32,33,34 may be advantageously applied with an adhesive substance to facilitate the connection of the panel 1 with another panel. For example, if the base material of the panel is cementitious mortar, a layer of adhesive mortar can be advantageously applied in the central cavity 31A,32A, 33A,34A. Thus, the composite panel 1 obtained with the method described above is operatively more versatile and easier to use than traditional panels.

Figure 9:
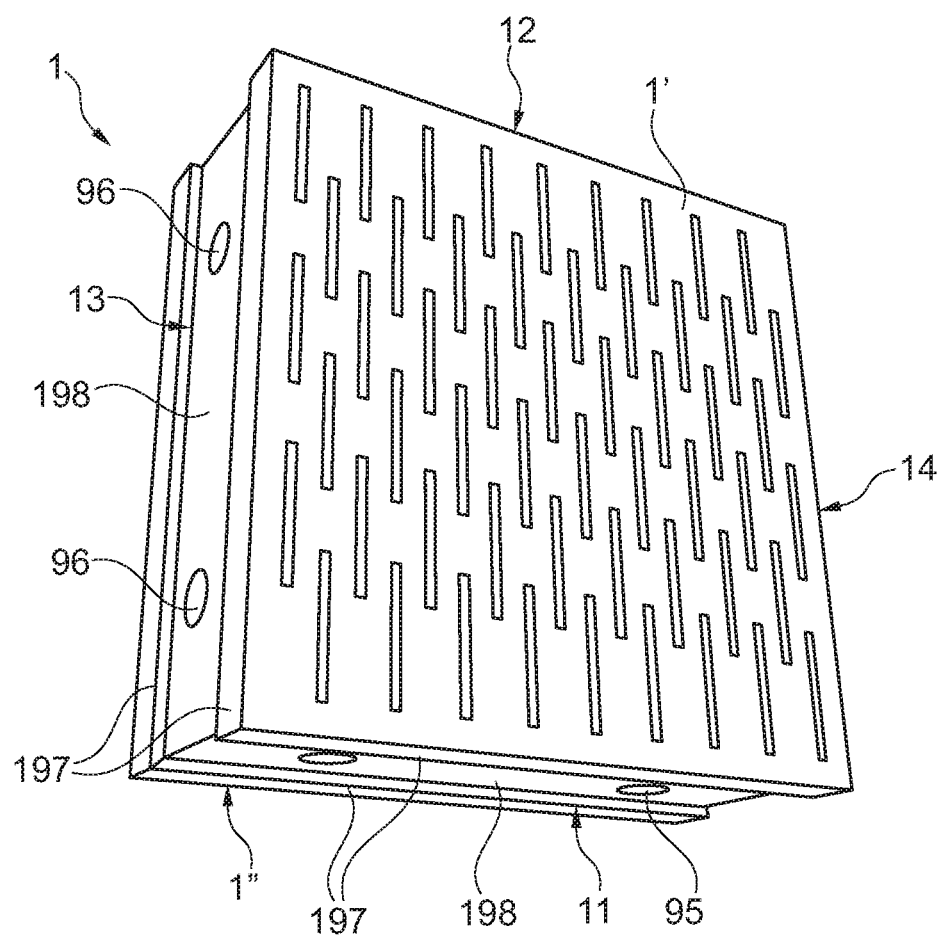
FIGS. 9 and 10 are a perspective view and a front view of a composite panel which can be obtained by means of a method according to the present invention, respectively.
Figure 10:
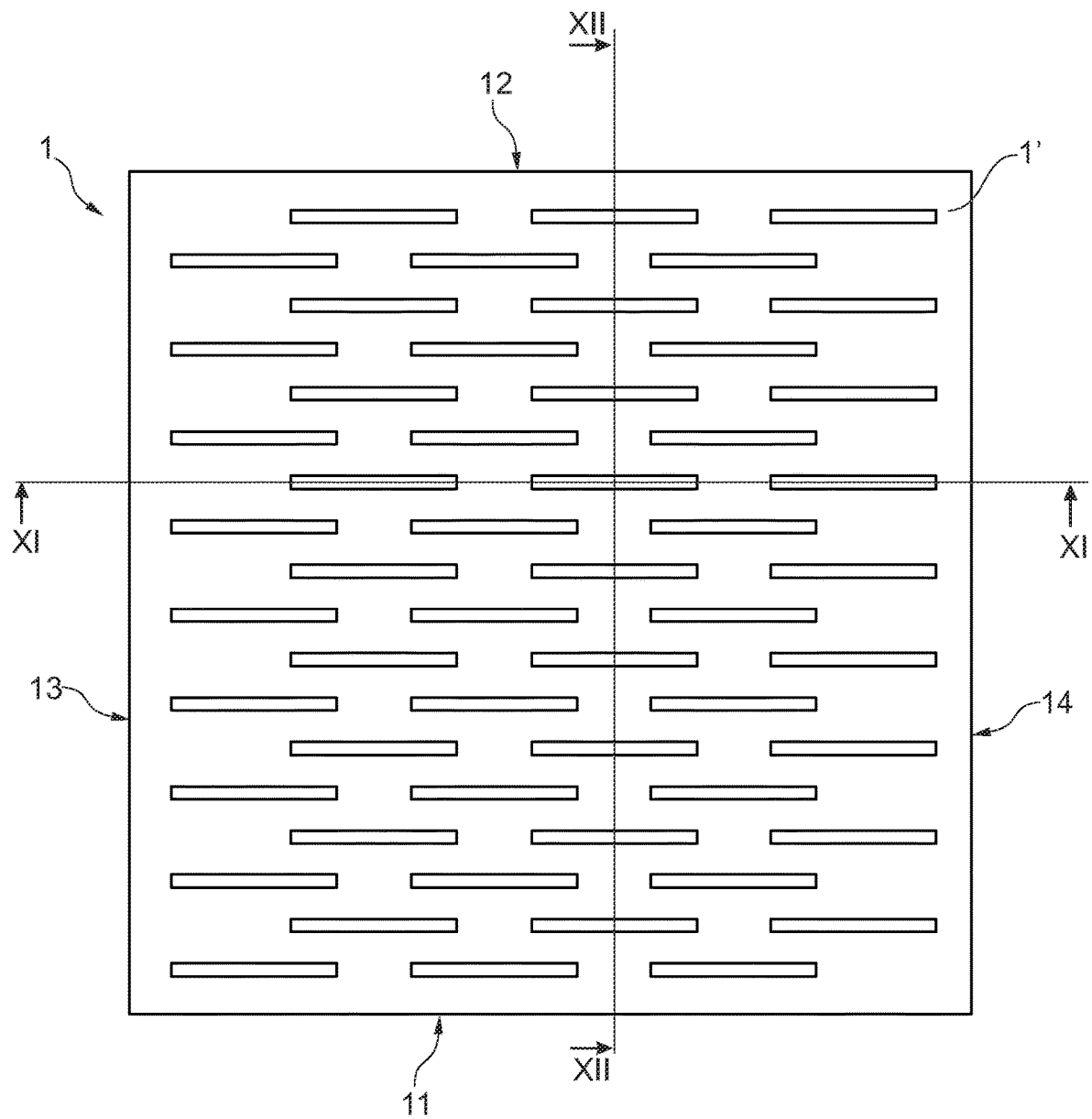

With reference to FIG. 9, it is worth noting that by virtue of the process described above, for each side portion 31,32, 33,34 in the central part 198 of the corresponding central cavity 31A,32A,33A,34A the connecting portions 96 of semi-finished part 8 described above remain visible. Indeed, by virtue of the method according to the invention, the shape of the peripheral surfaces 11,12,13,14 of the composite panel 1 will be geometrically conform with that of the inner side 91A,92A,93A,94A of the peripheral rib 91,92,93,94 of the semi-finished product 8. More precisely, for each side portion 31,32,33,34 of the composite panel 1, the geometry of the central cavity 31A,32A,33A,34A conforms with that of the central portion of surface X98 of the inner side 91A,92A,93A,94A of the peripheral rib 91,92,93,94 of the semi-finished product 8.

The possibility to make composite panels, the side portions of which are advantageously provided with parts configured to facilitate the connection with other panels, results therefrom. One or more of the side portions may, for example, comprise shaped parts emerging alternated with recessed portions configured to couple with to geometrically conforming parts of another panel. Substantially, the definition and/or shaping of the peripheral portions can be advantageously obtained by suitably defining the geometry of the peripheral ribs 91,92,93,94 and in particular the inner side 91A,92A,93A,94A thereof.

FIGS. from 13 to 15 show another embodiment of a semi-finished product (indicated by 8') which can be used in the method of embodiment according to the invention. Such a semi-finished product 8' differs from that shown in FIGS. from 1 to 4 substantially only for a different conformation of the outer side 91B,92B,93B,94B of the peripheral ribs 91,92,93,94. In particular, said outer side 91B,92B,93B,94B has a substantially trapezoidal shape with two inclined surfaces 77 converging towards a symmetry plane of the semi-finished product 8 is substantially parallel to its main surfaces 51,52. Said outer side 91B,92B,93B,94B also has a central flat surface 78 which extends between the two inclined portions 77 in a distal position from the inner side 91A,92A,93A,94A. This conformation of the outer side 91B,92B,93B,94B advantageously facilitates the extraction of the manufactured item 88' at the end of the setting process, as described in greater detail hereinafter to comment of FIGS. from 19 to 21.

In all cases, the semi-finished product 8,8',8" according to the invention is preferably made by sintered a heat-expanded material inside a mold 100, in which the passing elements 10 made of glass were previously arranged. FIGS. from 16 to 18 illustrate a possible configuration of a mold 100 suited for making the semi-finished product 8' shown in FIGS. from 13 to 15. However, the solutions described below may be employed, mutatis mutandis, also for making the semi-finished product 8 shown in FIGS. from 1 to 4 and more in general any other semi-finished product according to the present invention.

Specifically, the mold 100 comprises a first half-mold 101 and a second half-mold 102. One of the two half-molds (e.g. the second half-mold 102) is provided with feeding openings 103 through which the heat-expandable material in the form of pre-foamed beads (pearls) is loaded inside the mold 100. The first semi-mold 101 and the second half-mold 102 has such a shape to define, as a consequence of their union, a hollow inner volume geometrically conforming with the semi-finished product 8 which is intended to obtain. More precisely, the two half-molds 101,102 define, as a consequence of their union, an innermost volume unit, geometrically conforming to the central body 50 of the semi-finished product 8' to be made, and an outermost volume unit, which extends about the innermost volume unit in manner geometrically consistent with the peripheral ribs 91,92,93,94 of the semi-finished product 8' to be obtained.

The manufacturing method of the semi-finished product 8' provides placing light-transmitting elements 10 in predetermined positions inside the mold 100 so that a central portion 15 of the elements themselves is inside the mold 100, while a first end portion 16 and a second end portion 17 are outside the mold. The expressions "inside the mold 100" and "outside the mold 100" indicate a condition for which a corresponding portion 15,16,17 of the element 10 made of glass is either inside or outside the innermost volume unit configured in the mold following the union of the two half-molds 101,102, volume intended to be filled by the plastic material and to define the central body 50 of the semi-finished product 8' to be made.

The manufacturing method of the semi-finished product 8' further includes placing a plurality of nail pins in an adjacent position, and thus not occupied by the elements 10 made of glass, inside the mold 100. The conformation of such nail pins geometrically corresponds to that of the passages 70 provided for the central body 50 of the semi-finished product 8' to be made. The nail pins also lie within the first volume unit defined above following the closing of the two half-molds 101,102.

The manufacturing method of the semi-finished product 8' provides loading/filling the inner volume (central volume unit and peripheral volume unit) configured by the mold 100 with heat-expanded plastic material in the form of pearls. At the end of such a loading/filling, the mold 100 is brought to a predetermined temperature to activate the sintering process of the heat-expanded material. The mold 100 is kept at predetermined temperatures and for predetermined times according to a thermal cycle depending on the type of heat-expandable material used and the sizes of the semi-finished product 8'.

According to a preferred embodiment of the invention shown in the figures, each half-mold 101, 102 comprises a bottom portion 111,112 which defines a bottom surface 111A,112A inside the semi-mold 101,102 itself. For each half-mold 101,102, the bottom surface 111A,112A geometrically conforms with a corresponding main surface 51,52 of the central body 50 of the semi-finished product 8' to be obtained. Each half-mold 101,102 also comprises a first innermost peripheral frame 121,122 which extends on four sides 121A,122A from said bottom portion 111,112. As a result of the union of the two half-molds 101,102, the two peripheral frames 121,122 overlap defining four innermost peripheral walls and extend between the two bottom surfaces 111,112 delimiting the innermost volume unit within which the central body 50 is defined. In particular, the inner surfaces of such peripheral walls geometrically conform with a corresponding side surface 61,62,63,64 of the central body 50 of the semi-finished product 8' to be made. Instead, the outer surfaces of such peripheral walls geometrically conform with the inner side of a corresponding peripheral rib 91,92,93,94 of the central body 50 of the semi-finished product 8' to be made (as clearly shown in the view in FIG. 18).

Each half-mold 101,102 also comprises an outermost peripheral frame 123,124 which extends on the four sides 123A,124A from the corresponding bottom portion 111,112 surrounding the corresponding innermost peripheral frame 121,122. As a result of the union of the two half-molds 101,102, the two outermost peripheral frames 123,124 overlap defining four outermost peripheral containing walls which extend between the two bottom surfaces 111,112, whereby delimiting the outermost volume unit which defines within the peripheral ribs 91,92,93,94, together with the innermost peripheral walls 121A,122A. In particular, the inner surfaces 123B, 124B of the outermost peripheral walls 123A,124B geometrically conform with the outer side of a corresponding peripheral rib 91,92,93,94 of the central body 50 of the semi-finished product 8' to be made (see FIG. 18).

According to another aspect, for each half-mold 101,102, each side of the innermost peripheral frame 121,122 defines a plurality of recesses 119,129 of preferably semicircular shape, at the distal edge of the corresponding bottom surface 111, 112. Following the union of the two half-molds 101, 102,119,129 recesses of the two peripheral frames 121,122 face and combine defining, as a whole, a plurality of circular openings through the peripheral walls defined precisely by the union of the frames 121,122 themselves. Such circular openings make the innermost volume unit communicate with the outermost volume unit. After sintering, the plastic material thus expands also through these openings to define the connecting portions 96 which connect each peripheral surface 61,62,63,64 of the semi-finished product 8' with a corresponding peripheral rib 91,92,93,94.

Figure 16:
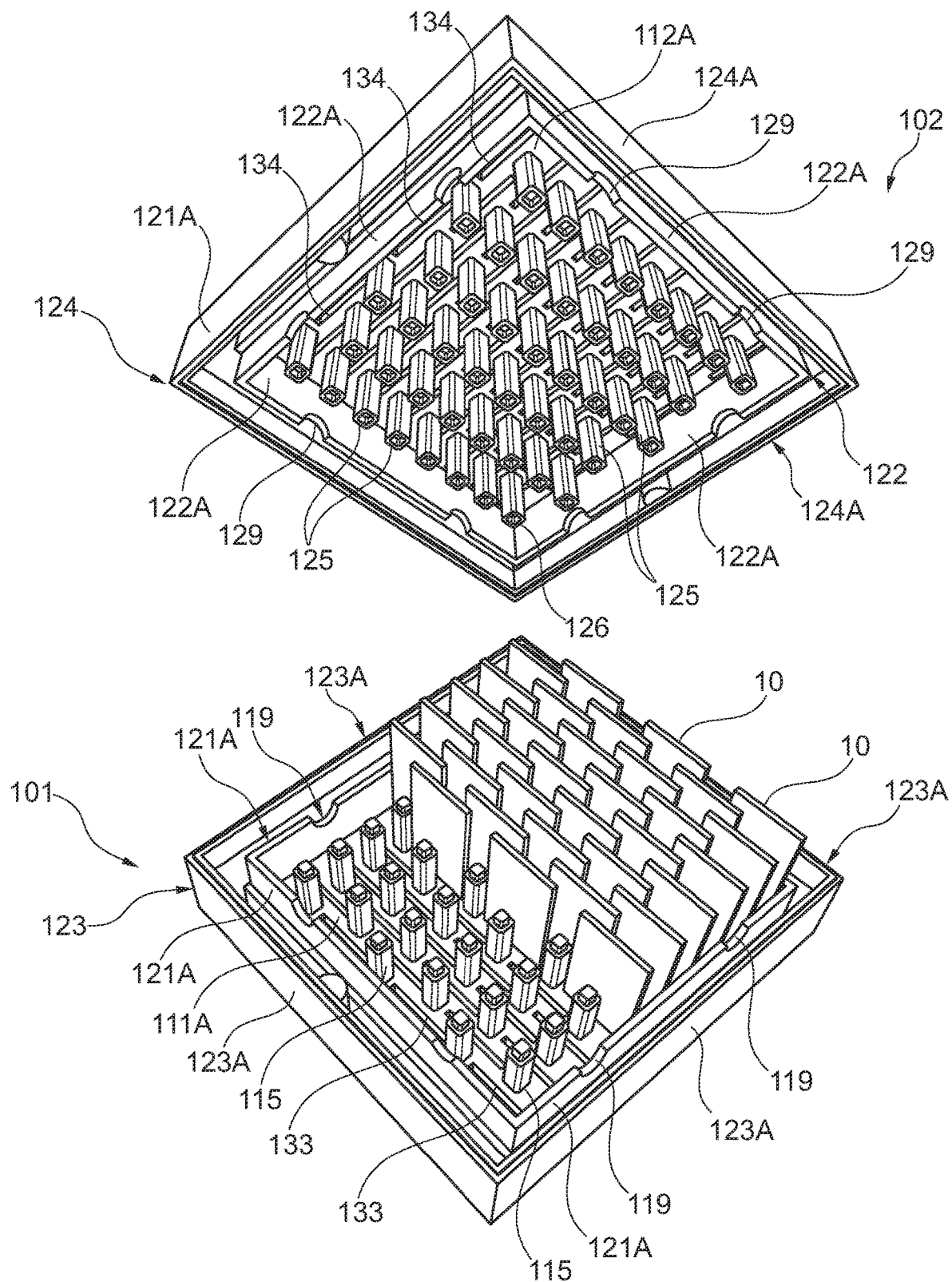
FIGS. 16, 17 and 18 are views relating to a mold for carrying out the semi-finished product shown in FIGS. from 13 to 15.

According to a preferred embodiment, each half-mold 101,102 further defines a plurality of seats 133,134 which protrude inside the bottom portion 111,112 starting from the respective bottom surface 111A,112A (see FIG. 16). Each of said seats 133,134 is configured to accommodate a corresponding end portion 16,17 of transmitting elements 10 made of glass. Therefore, the shape of each of the housing seats 133,134 geometrically corresponds to that of the end part 16,17 to be housed.

Figure 17:
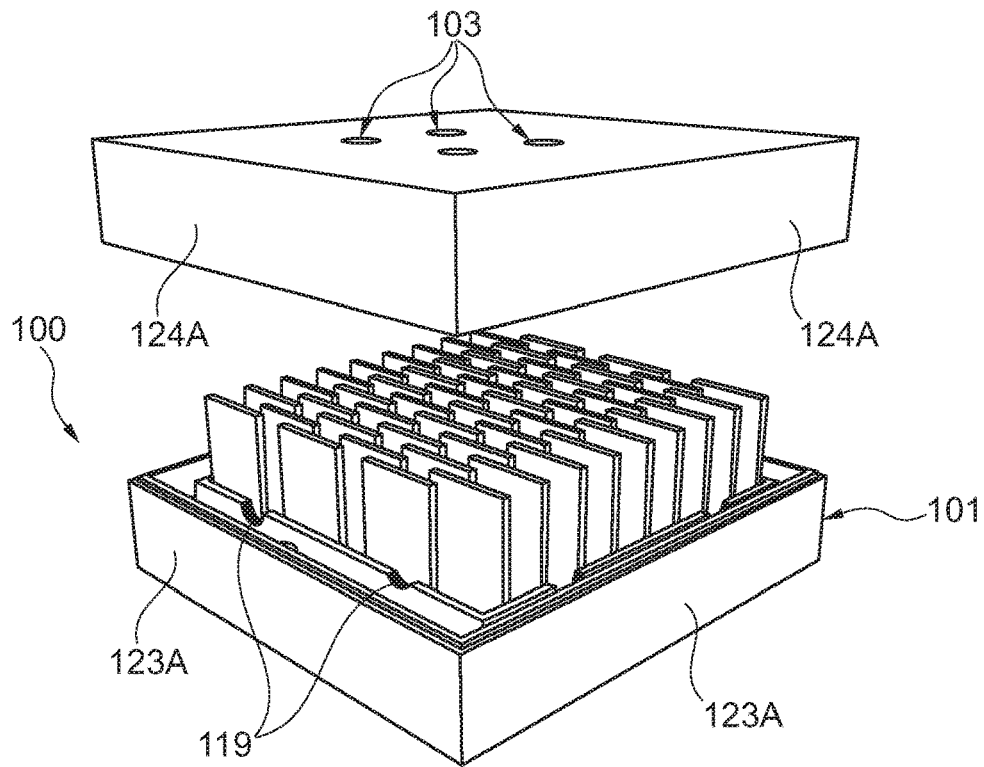

Preferably, a first end portion 16 of each through element 10 is first inserted into a corresponding seat 133 formed in the bottom portion 111 of the first half-mold 101 (see FIG. 9). In this manner, all the elements 10 are temporarily associated with the first semi-mold 101 (condition in FIG. 17). Successively, the two half-molds 101,102 are coupled so that for each through element 10, the second end portion 17 is inserted (and remains housed once the coupling is completed) in the corresponding housing seat 134 formed in the bottom portion 112 of the second mold-half 102. In this manner, for each through element 10, only the central part 15 remains in the hollow inner volume defined upon the completion of the union of the two half-molds 101,102.

Figure 18:
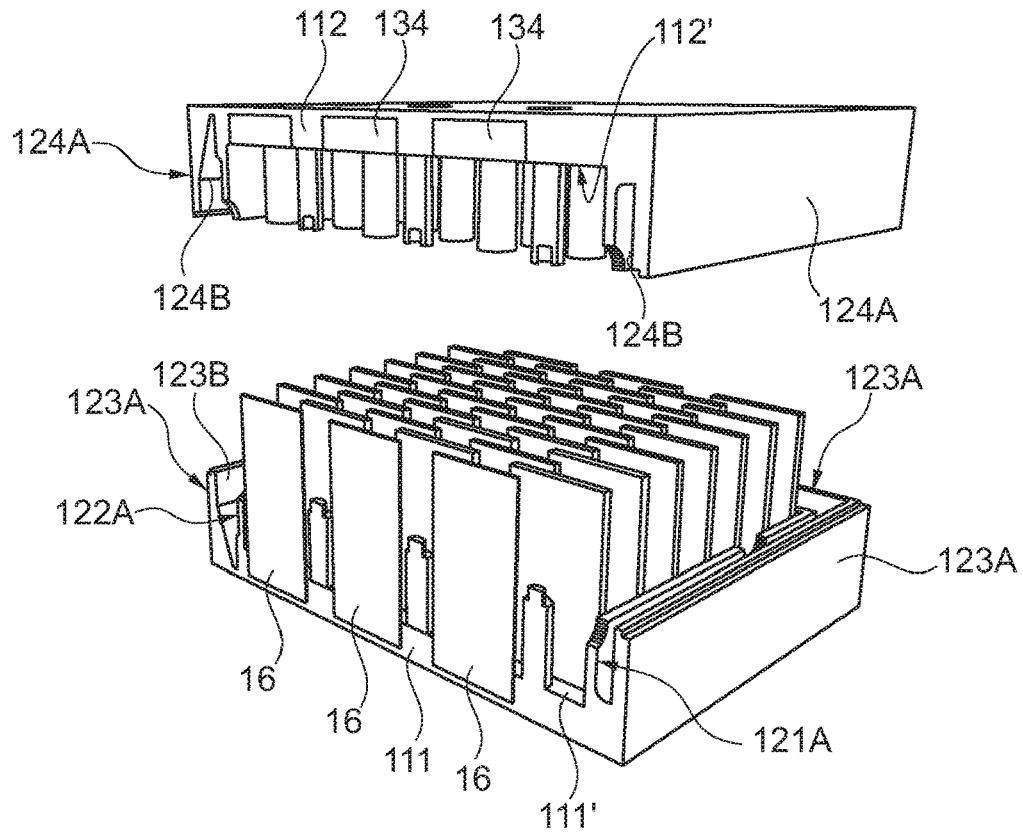

The section view of FIG. 18 shows that the first end part 16 of the through elements 10 housed in a corresponding seat 133 defined in the bottom portion 111 of first mold 101, while the remaining part of the central portion 15 and the second part 17 emerge from the bottom surface itself. The seats 134 formed in the bottom portion 112 of the second mold 102 into each of which the second end portion 14 of a corresponding through element 10 will be inserted and will remain housed again with reference to FIG. 18.

Again with reference to FIG. 16, each half-mold 101,102 preferably comprises a plurality of nail pins 115,125 which extend from the bottom surface 111, 112 of a corresponding half-mold 101,102 inside the volume defined by the innermost perimeter frame 121,122 of the semi-mold itself. In particular, these pins 115,125 extend from portions of the bottom surface 111A,112A between the housing seats 133, 134 defined above.

Each of the nail pins 115,125 of one of the half-molds 101,102 comprises an end 116,126 configured to couple, following the union of the two half-molds 101,102, with one end geometrically conforming with a corresponding nail pin 115,125 of the other half-mold 101,102. In this manner, after joining the two half-molds 101,102 is defined by a plurality of longitudinal pins (each generated by the union of two nail pins 115,125) which extend between the two bottom surfaces 111A,112A of the two half-molds 101,102. In the example in FIG. 16, each of the nail pins 115 defined within the first half-mold 101 has one male end 116 to be inserted at a female end 126 of a corresponding nail pin 125 defined within the second mold-half 102. Further, the length of the nail pins 115,125 of the two half-molds 101,102 is substantially half the total length of the longitudinal pin generated as a result of the union of the two half-molds 101.

The embodiment shown in FIG. 16 and described above is only one possible, and thus not exclusive embodiment, of the two half-molds 101,102 and in particular of the nail pins 115,125. For example, the length of the nail pins 115,125 of one of the two half-molds may be markedly different from the one of the pins of the other half-mold. In a further variant, only one of the two molds 101,102 may include nail pins which protrude from the corresponding bottom surface for a length either equal to or greater than the distance between the two bottom surfaces of the two mold half-molds 101,102, this distance being considered in a closed condition of the mold 100. In this case, the ends of the nail pins could be shaped to be inserted in the corresponding housings configured in the bottom portion of the semi-mold which does not include nail pins.

Figure 19:
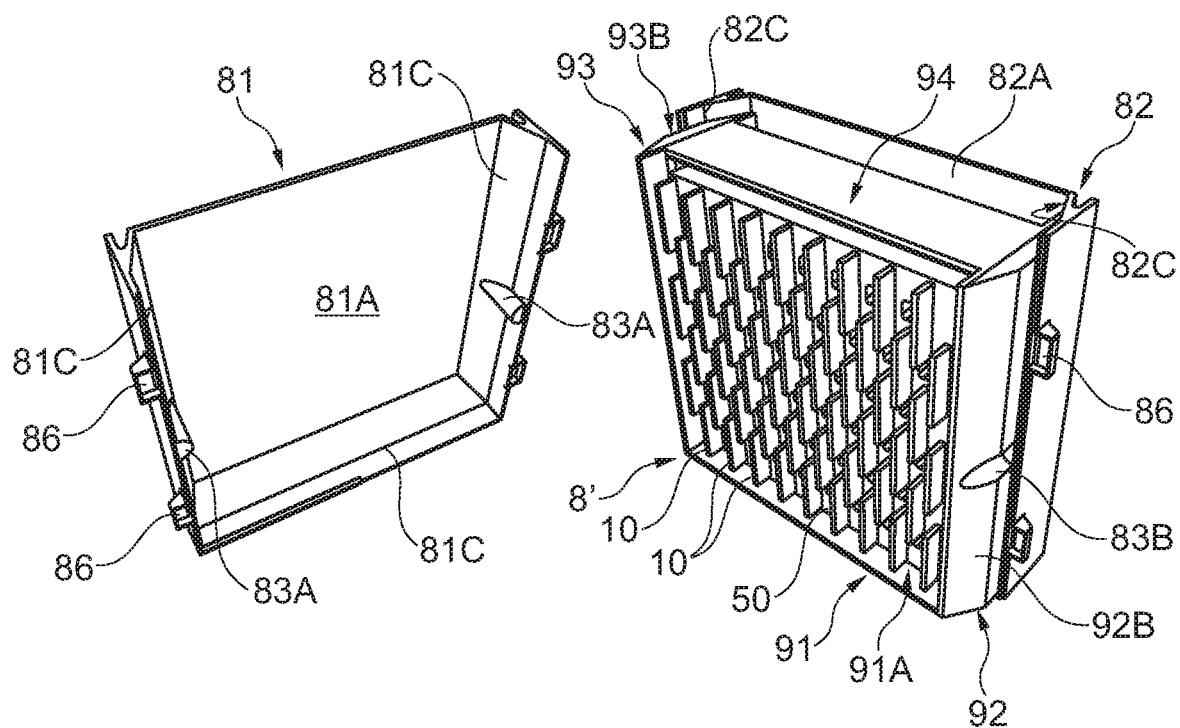
FIGS. 19, 20 and 21 are views relating to a step of the method for carrying out the semi-finished product shown in FIGS. from 13 to 15.
Figures 20, 21:
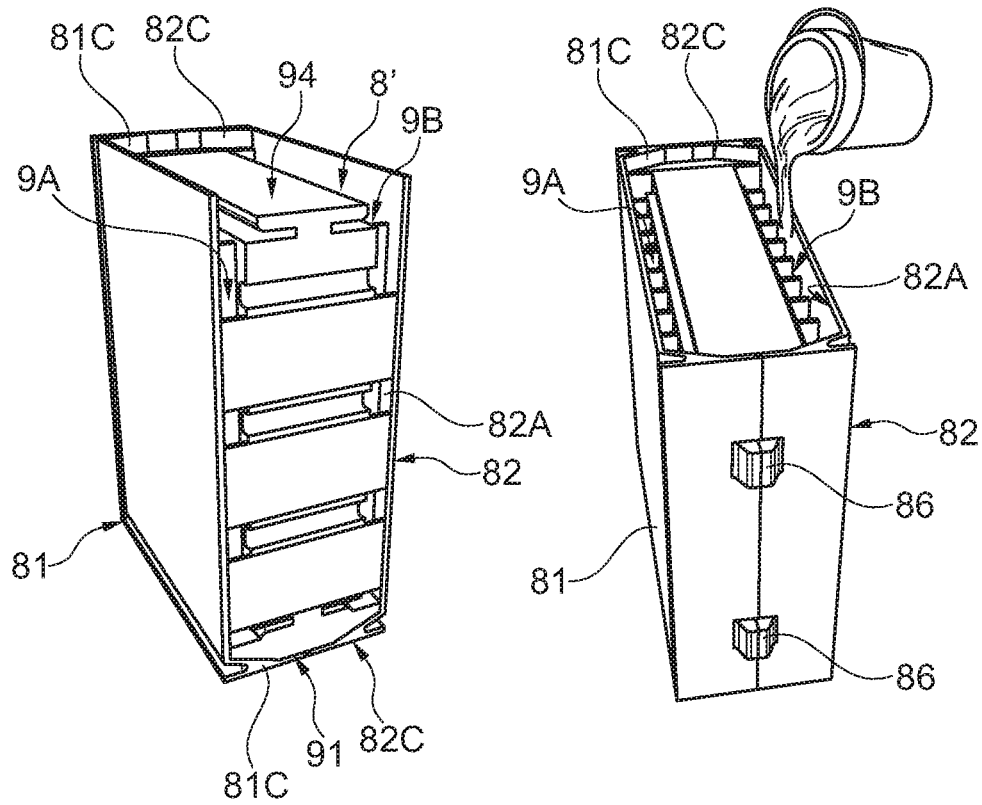

FIGS. 19 and 20 refer to the step of pouring of a method according to the invention which provides for the use of the semi-finished product 8' (FIGS. from 13 to 15) for making the composite panel 1. In particular, these figures show the conformation of the two containing elements 81,82 used for the step of pouring. In accordance with the present invention, each containing element 81,82 defines a closing surface 81A,82A from which three containing sides 81C,82C extend, the inner surface of which geometrically conforms with a portion of the outer side 91B,92B,93B of a corresponding peripheral rib 91,92,93 of the semi-finished product 8, as can easily be seen in FIG. 19. Indeed, the figure shows the semi-finished product 8 housed in the second containing element 82 and before the semi-finished product 8' itself is closed, on the other side, by the second containing element 81 (condition in FIG. 20).

In this regard, the two containing elements 81,82 are mutually connected at the containing sides 81C,82C through appropriate fixing means 86. The containing sides 81C,82C and the fixing means allow to support the side thrust of the material during its pouring (FIG. 20). In this regard, each containing element 81,82 preferably comprises a centering element 83A defined on two opposite containing sides 81C,82C. Such centering elements 83A are configured to be inserted in corresponding centering recesses 83B defined on the opposite outer side 92B,93B of two mutually opposite peripheral ribs 92,93. The centering elements 83A, when inserted into the respective seats 93B, stably fix the position of the semi-finished product 8' between the two containing elements 81,82 avoiding possible displacements of the same semi-finished product 8'.

It is worth noting that the centering cavities 83B may be formed by appropriately shaping the two half-molds 101, 102 employed for the sintering of the semi-finished product 8'. In particular, such a centering cavity 83B can be defined by appropriately shaping the inner surfaces of the sides 123A,124A of the outermost peripheral frame 123,124 of each half-mold 101,102, as can easily be seen from FIG. 16.

Again with reference to FIG. 20, once the two containing elements 81, 82 are connected, the material may be poured into the two half-spaces 9A,9B defined between the semi-finished product 8' and the closing surfaces 81A,82A of the two containing elements 81,82. In this regard, the section view in FIG. 21 shows how each half-space 9A,9B remains delimited by the three peripheral ribs 91,92,93 and is open instead on the side of the fourth peripheral rib 94, as indicated above. Also in this case, it can be seen that the base material can be poured in one or both half-spaces 9A,9B which remain communicating through the passages 70 defined through the central body 50 of the semi-finished product 8'.

Figure 22:
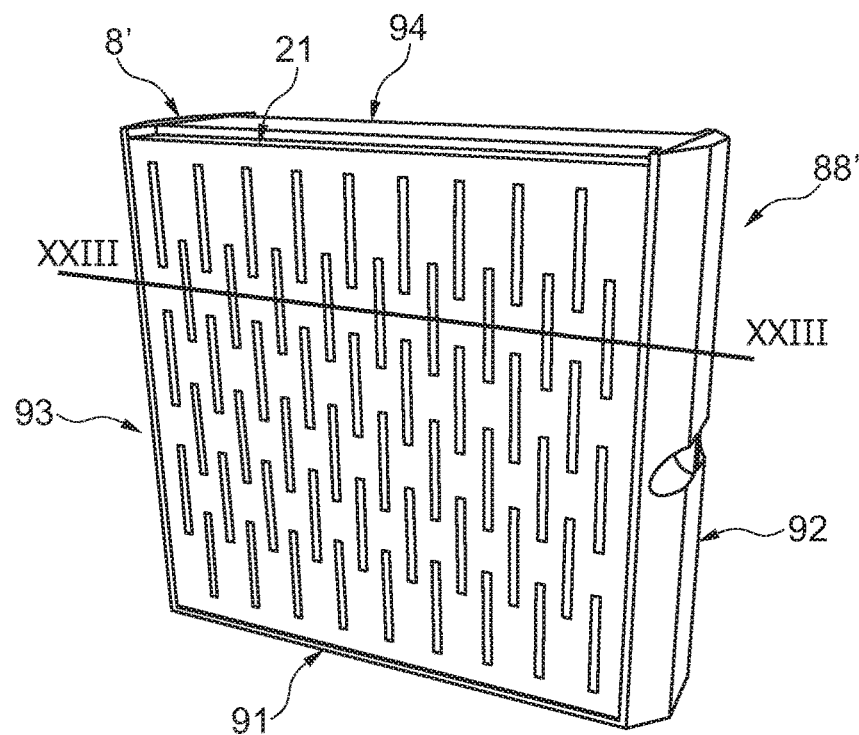
FIGS. 22 and 23 are a perspective view and a section view along plane XXIII of a manufactured item obtained by using a semi-finished product in FIGS. from 13 to 15 in a method according to the invention, respectively.
Figure 23:
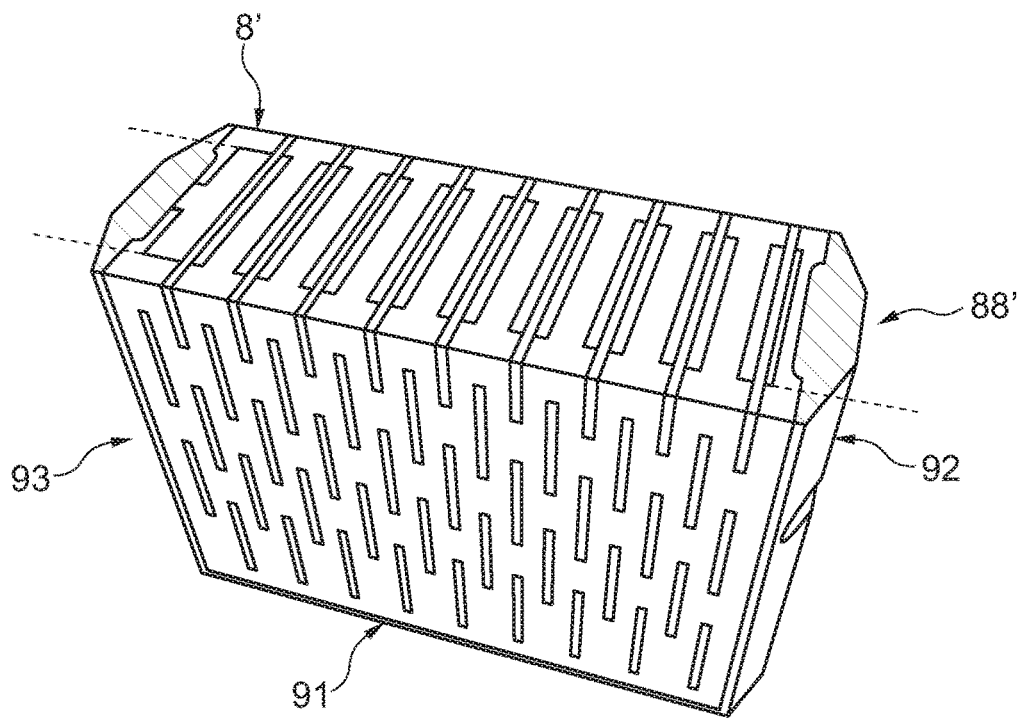

FIGS. 22 and 23 show a product (indicated by 88') extracted from the two containing elements 81,82 at the end of the step of curing of the base material. The duration of this step depends on the nature of the base material, the size of the desired panel and therefore the amount of base material used and also on the environmental conditions in which it is made the curing. It is worth noting that the particular conformation provided for the outer side 91B,92B,93B of the peripheral ribs 91,92,93 advantageously facilitates the separation of the two containing elements 81,82 and the subsequent removal of the semi-finished product 8'.

In accordance with the method according to the invention, after extraction from the containing elements, the manufactured item 88' is finished by eliminating the peripheral ribs 91,92,93,94 in order to obtain the desired composite panel 1 which assumes a shape corresponding to that shown in the FIGS. from 9 to 12 and described above. In this regard, in the section view of FIG. 23, the parts of the semi-finished product 8' which are eliminated with the step of finishing are shown with dashed lines, as opposed to those that instead remain incorporated in the composite panel 1.

Figure 24:
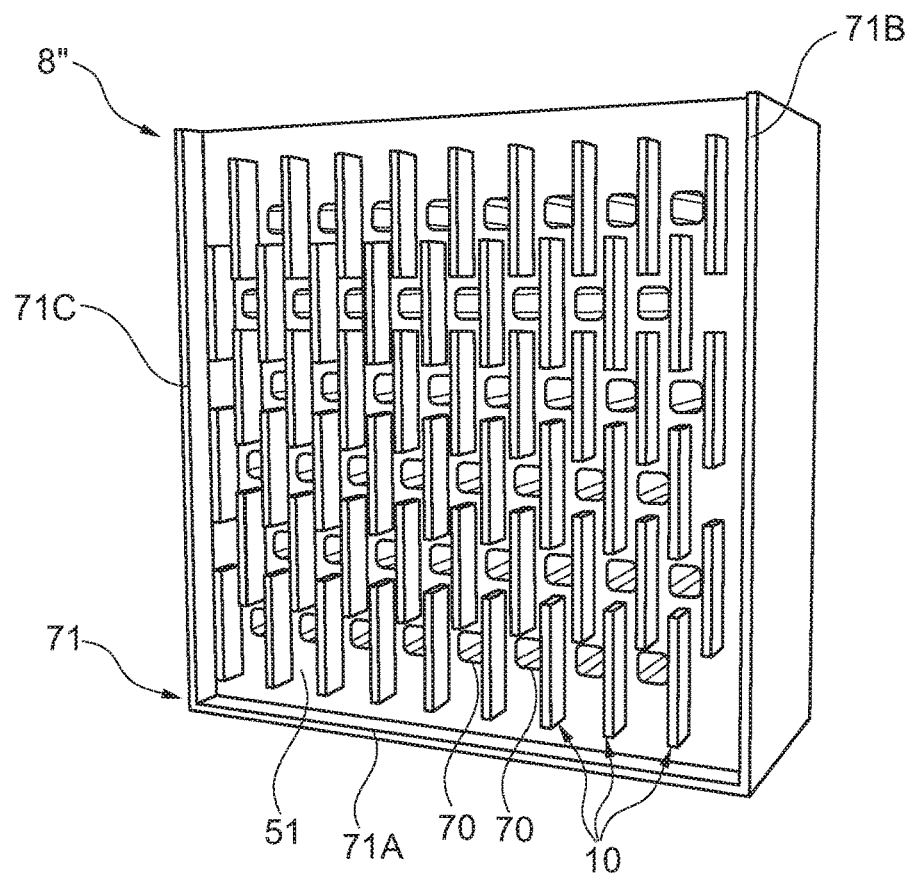
FIGS. 24 and 25 are perspective views, from substantially opposite view points, of a third embodiment of a semi-finished product which can be used in a method for making composite panels according to the present invention.
Figure 25:
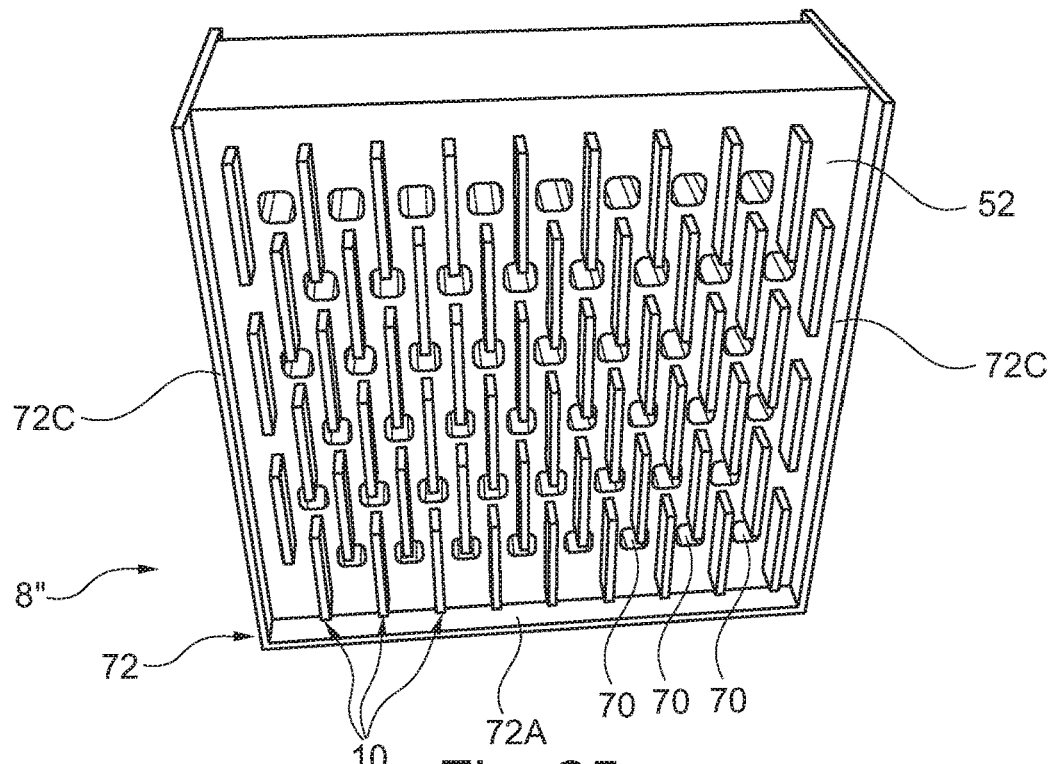

FIGS. 24 and 25 relate to a further embodiment of a semi-finished product (indicated by 8'') which differs from the other embodiments described for a different conformation of the two containing frames 71,72 connected to the central body 50. Indeed, in this case, the first containing frame 71 is defined by three portions 71A,71B,71C continuously connected to one another which emerge (in the reference direction 101) directly from the first main surface 51 of the central body 50. Similarly, the second containing frame 72 is defined by three portions 71A,71B,71C continuously connected to one another which emerge (in the reference direction 101) directly from the second main surface 52 of the central body 50. In this embodiment, the portions forming the three portions of the two containing frames 71,72 are not spaced from the central body 50, but on the contrary emerge from a corresponding main surface 51,52 of the body itself.

In the embodiment in FIGS. 24 and 25, the conformation of the central body 50 (e.g. in terms of shape geometry, distribution of the through elements 10 and/or of the passages 70) substantially corresponds to that described above for the other two embodiments. Moreover, also the semi-finished product 8" can be advantageously made by sintering of plastic material in a mold in accordance with a method substantially corresponding to that described above as a comment on the semi-finished product 8'. Such a method obviously requires a suitable inner conformation for the two half-molds 101,102 so as to obtain the two containing frames 71,72 shown in FIGS. 24 and 25.

FIG. 26 is a perspective view of the manufactured item (indicated by 88") obtained following the step of pouring and subsequent step of setting made according to the principles already set forth above. The manufactured item 88" is finished in order to eliminate the containing frames 71,72 described above. In FIG. 26, the parts intended to be eliminated through the step of finishing are shown by dashed lines. Also in this case, the step of finishing preferably provides cutting, by means of hot wire, the containing frames 71,72 at the interface with the parts of the composite panel made of set base material. In FIG. 26, T1, T2 and T3 indicate the planes along which the hot wire cutting is performed.

Given the different conformation of the containing frames 71,72 even the composite panel (indicated by 1' and shown in FIGS. 27 and 28) have a different shape from the one obtained through the use of semi-finished products 8,8' described above. In particular, with respect to the composite panel 1 shown in FIGS. from 9 to 12, the composite panel 1' does not comprise peripheral portions made of the set base material surrounding the central body 50. Therefore, each of the peripheral surfaces 11,12,13,14 of panel 1' will be formed by an "exposed" central part 12A,13A,14A, made of sintered plastic material, between the two parts 12B,13B, 14B made of set base material, each defined by one of the main portions 23,24 of the composite panel 1.

The method according to the invention allows to achieve the predetermined tasks and objects. In particular, the panel which can be obtained through this method according to the invention is considerably lighter than the panels currently used in the field, and for this reason can be easily transported and handled. Therefore, the installation is also advantageously simplified.

The invention claimed is:

1. A method for carrying out a cementitious mortar based composite panel comprising a plurality of through elements made of glass for transmitting light between two mutually opposite base surfaces of said panel, and wherein said through elements extend along a reference direction, wherein it comprises the steps of:

carrying out a semi-finished product comprising a central body which incorporates a central part of said plurality of through elements made of glass, wherein said central body defines a first main surface from which a first end part of said through elements emerges and a second main surface from which a second end part of said through elements emerges, and wherein said semi-finished product comprises:

at least one first containing frame which emerges, in the direction of said reference direction, with respect to said first main surface and which extends about a first part of the perimeter of said first main surface, and said first containing frame facing said first end part of said through elements;

at least one second containing frame which emerges, in the direction of said reference direction, with respect to said second main surface and which extends about a first part of the perimeter of said second main surface, said second containing frame facing said second end part of said through elements;

closing said semi-finished product between a first containing element and a second containing element, each of which defining a closing surface, said semi-finished product being arranged so as to define two half-spaces, each of which delimited by one of said closing surfaces, one of said main surfaces of said central body and one of said containing frames, and wherein each half-space is open at a second part of the respective perimeter of the first main surface and of the second main surface which is different from said first part of the respective perimeter of the first main surface and of the second main surface;

filling said half-spaces with said cementitious mortar;

following the setting of said cementitious mortar, extracting a manufactured item comprising said semi-finished product, a first main portion and a second main portion made of said cementitious mortar, wherein said main portions are mutually opposite with respect to the central body of said semi-finished product;

finishing said manufactured item by eliminating said containing frames of said semi-finished product.

2. The method according to claim 1, wherein said semi-finished product is made by sintering a heat-expanding material in a mold.

3. The method according to claim 2, wherein said semi-finished product comprises a plurality of passages which extend between said main surfaces.

4. The method according to claim 2, wherein said manufactured item is finished by using a guided hot wire so as to eliminate said containing frames of said semi-finished product.

5. A semi-finished product for implementing a method according to claim 1, wherein said central body comprises four side surfaces and wherein said semi-finished product comprises a peripheral containing structure which includes:

a first rib in position facing and spaced apart from a first side surface of the four side surfaces, wherein said first rib defines a first portion of said first containing frame and a first portion of said second containing frame;

a second rib in position facing and spaced apart from a second side surface of the four side surfaces, wherein said second rib defines a second portion of said first containing frame and a second portion of said second containing frame;

a third rib in position facing and spaced apart from a third side surface of the four side surfaces, wherein said third rib defines a third portion of said first containing frame and a third portion of said second containing frame.

6. The semi-finished product according to claim 5, wherein:
the first, second and third portions of said first containing frame are connected continuously and their edges define a plane which is substantially parallel to the plane on which said first main surface of said central body extends; and
the first, second and third portions of said second containing frame are connected continuously and their edges define a plane which is substantially parallel to the plane on which said second main surface of said central body extends.

7. The semi-finished product according to claim 6, wherein said peripheral structure comprises a fourth peripheral rib which extends in position facing and spaced apart from a fourth peripheral surface of said central body, and wherein said fourth rib does not emerge with respect to said main surfaces of said semi-finished product.

8. The semi-finished product according to claim 7, wherein each of said peripheral ribs is connected to the corresponding side surface which it faces and from which it is spaced apart through at least one connecting portion.

9. The semi-finished product according to claim 8, wherein at least one of said peripheral ribs defines an inner side facing the corresponding side surface of said central body, and an outer side opposite to said inner side, and wherein said inner side comprises a surface portion which extends on a plane spaced apart by one from the corresponding side surface of said central body.

10. The semi-finished product according to claim 9, wherein the inner side of said at least one of said peripheral ribs comprises a central surface portion and two mutually opposite coplanar surface portions with respect to said central surface portion, wherein said central surface portion extends on a plane the distance (H1) of which from the corresponding side surface of said central body is shorter than the distance between the plane on which said coplanar surfaces and the side surface itself extend.

11. The semi-finished product according to claim 10, wherein said outer side of said at least one of said peripheral ribs extends on a plane.

12. The semi-finished product according to claim 11, wherein said outer side of said at least one peripheral rib has a substantially trapezoidal conformation with two inclined surfaces converging towards a symmetry plane of said semi-finished product, which is substantially parallel to the planes on which said main surfaces of said central body extend, said outer side having a flat central surface which extends between said inclined surfaces in position distal from said inner side.

13. The semi-finished product for implementing a method according to claim 1, wherein said first containing frame comprises three portions connected continuously which directly emerge from said first main surface of said central body, thus extending along three sides of the first surface itself, and wherein said second containing frame comprises three portions connected continuously which directly emerge from said second main surface of said central body, thus extending along three sides of the second main surface itself, wherein each of said three portions of said first containing frame is opposite, with respect to said central body, to a corresponding portion of said second containing frame.

14. A cementitious mortar based composite panel comprising a semi-finished product manufactured in accordance with the method of claim 1 wherein said central body comprises four side surfaces and wherein said semi-finished product comprises a peripheral containing structure which includes:
a first rib in position facing and spaced apart from a first side surface of the four side surfaces, wherein said first rib defines a first portion of said first containing frame and a first portion of said second containing frame;
a second rib in position facing and spaced apart from a second side surface of the four side surfaces, wherein said second rib defines a second portion of said first containing frame and a second portion of said second containing frame; and
a third rib in position facing and spaced apart from a third side surface of the four side surfaces, wherein said third rib defines a third portion of said first containing frame and a third portion of said second containing frame;
wherein said panel comprises:
said central body and said through elements of said semi-finished product, wherein said elements of through elements transmit the light between two opposite base surfaces;
a first main portion made of cementitious mortar between said first base surface of said panel and said first main surface of said central body, said first main portion incorporating said first end part of said through elements;
a second main portion made of cementitious mortar between said second base surface of said panel and said second main surface of said central body, said second main portion incorporating said second end part of said through elements;
a plurality of through portions made of cementitious mortar which extend through said inner structure, thus connecting said first main portion to said second main portion made of cementitious mortar, and wherein for at least one of said through elements, the extension of said central part is greater than the extension of each of said end parts of said through elements incorporated in said main portions made of cementitious mortar.

15. The panel according to claim 14, wherein:
said panel comprises a first peripheral surface and a mutually opposite second side surface, which extend on planes which are parallel to each other and are orthogonal to said base surfaces;
said central body of said semi-finished product comprising a first side surface and a mutually opposite second side surface, which extend on parallel planes, and wherein said panel comprises:
a first side portion made of cementitious mortar between said first peripheral surface of said panel and said first side surface of said central body,
a second side portion made of cementitious mortar between said second peripheral surface of said panel and said second side surface of said central body.

16. The panel according to claim 15, wherein:
said panel comprises a third peripheral surface and a mutually opposite fourth peripheral surface, which extend on planes parallel to each other and orthogonal to the planes on which said first peripheral surface and said second peripheral surface extend;
said central body of said semi-finished product comprising a third side surface and an opposite fourth side surface, which extend on planes substantially parallel to each other and orthogonal to the planes on which said first side surface and said second side surface extend, and wherein said panel comprises:
- a third side portion made of cementitious mortar between said third peripheral surface of said panel and said third side surface of said inner structure,
- a fourth side portion made of cementitious mortar between said fourth peripheral surface of said panel and said fourth side surface of said inner structure.

17. The panel according to claim 16, wherein at least one of said side portions of said panel defines a central cavity which extends for the whole extension of the portion itself.

\* \* \* \* \*